(12) United States Patent
Hutcheon et al.

(10) Patent No.: US 10,785,915 B2
(45) Date of Patent: Sep. 29, 2020

(54) AGRICULTURAL BIN

(71) Applicant: COOLAMON STEELWORKS PTY LTD, Coolamon, NSW (AU)

(72) Inventors: George Bruce Hutcheon, Coolamon (AU); Heath John Hutcheon, Estella (AU)

(73) Assignee: Coolamon Steelworks Pty Ltd, Coolamon (AU)

( * ) Notice: Subject to any disclaimer, the term of this patent is extended or adjusted under 35 U.S.C. 154(b) by 0 days.

(21) Appl. No.: 16/101,155

(22) Filed: Aug. 10, 2018

(65) Prior Publication Data

US 2019/0045714 A1  Feb. 14, 2019

(30) Foreign Application Priority Data

Aug. 10, 2017  (AU) ................. 2017903187

(51) Int. Cl.
| *A01C 15/00* | (2006.01) |
| *A01D 90/10* | (2006.01) |
| *B65G 67/24* | (2006.01) |
| *A01C 17/00* | (2006.01) |

(52) U.S. Cl.
CPC ............ *A01D 90/10* (2013.01); *A01C 15/006* (2013.01); *B65G 67/24* (2013.01); *A01C 17/001* (2013.01); *B65G 2814/0326* (2013.01)

(58) Field of Classification Search
CPC .............. A01D 41/1217; A01C 15/006; B65G 2814/0326
See application file for complete search history.

(56) References Cited

U.S. PATENT DOCUMENTS

| 10,028,442 | B1 * | 7/2018 | Crosby ................... B60P 3/00 |
| 2003/0168535 | A1 * | 9/2003 | Hollinrake ............ E01C 19/203 239/672 |
| 2012/0237325 | A1 * | 9/2012 | Flickinger .......... A01D 41/1217 414/502 |
| 2017/0208745 | A1 * | 7/2017 | Reints ..................... A01F 15/10 |

* cited by examiner

*Primary Examiner* — Saul Rodriguez
*Assistant Examiner* — Willie Berry, Jr.
(74) *Attorney, Agent, or Firm* — Mintz Levin Cohn Ferris Glovsky and Popeo, P.C.

(57) ABSTRACT

The invention provides a transportable agricultural bin for storing and dispersing an agricultural material. The invention also provides a trailer or a vehicle including the transportable agricultural bin.

16 Claims, 17 Drawing Sheets

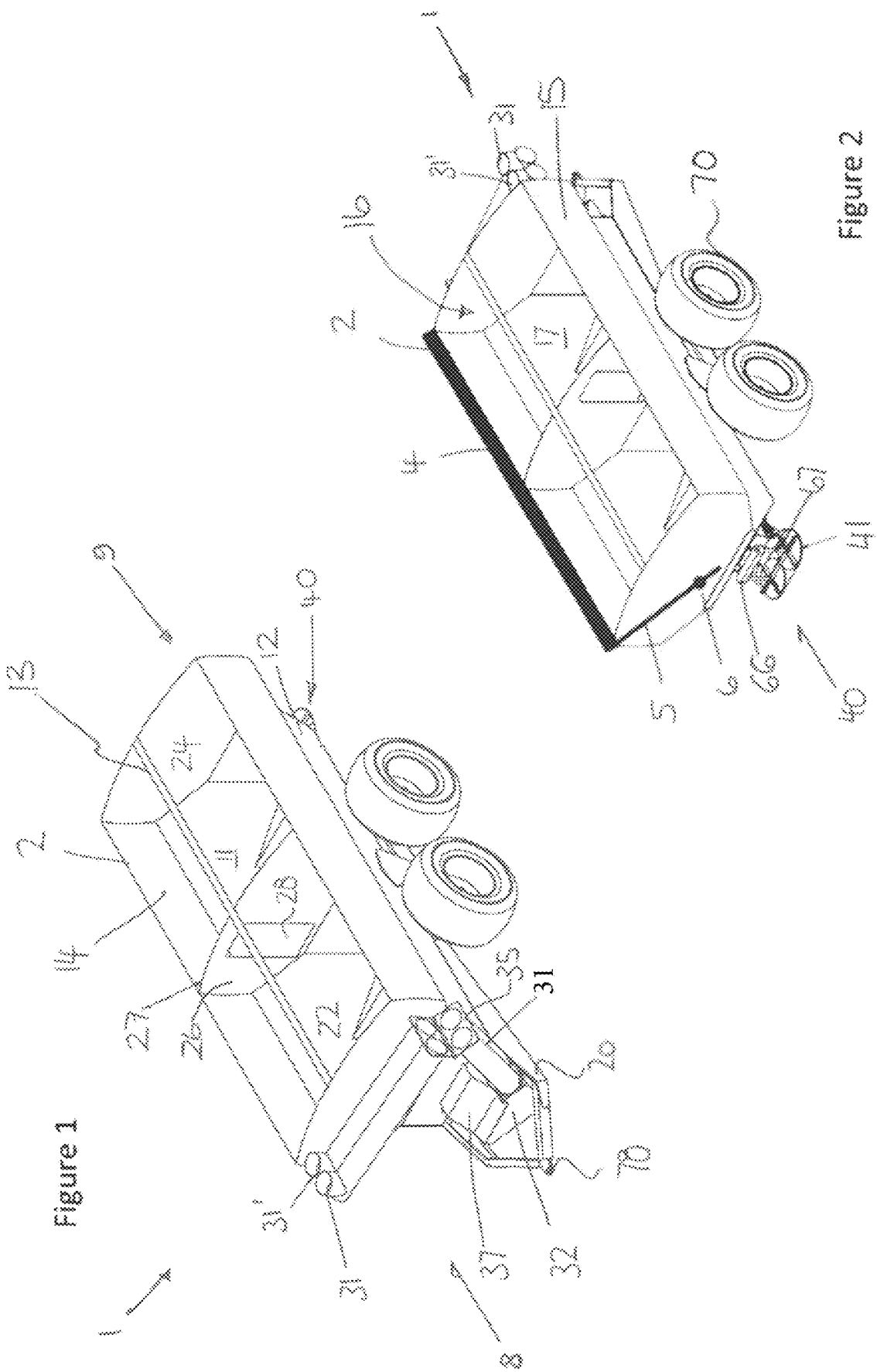

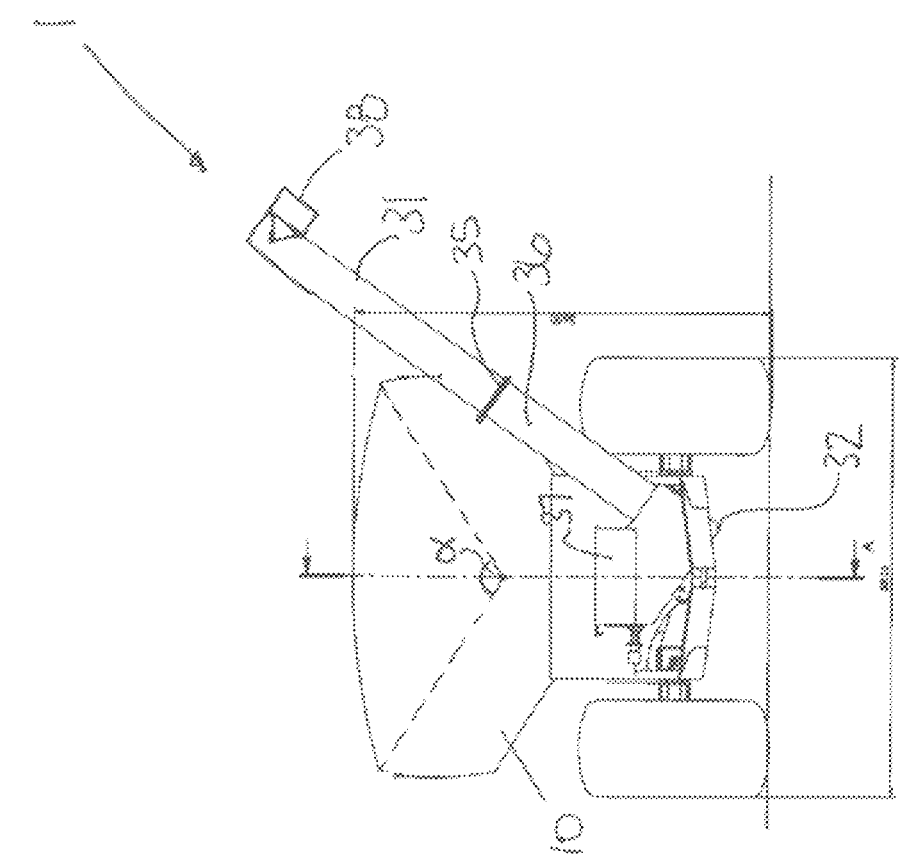
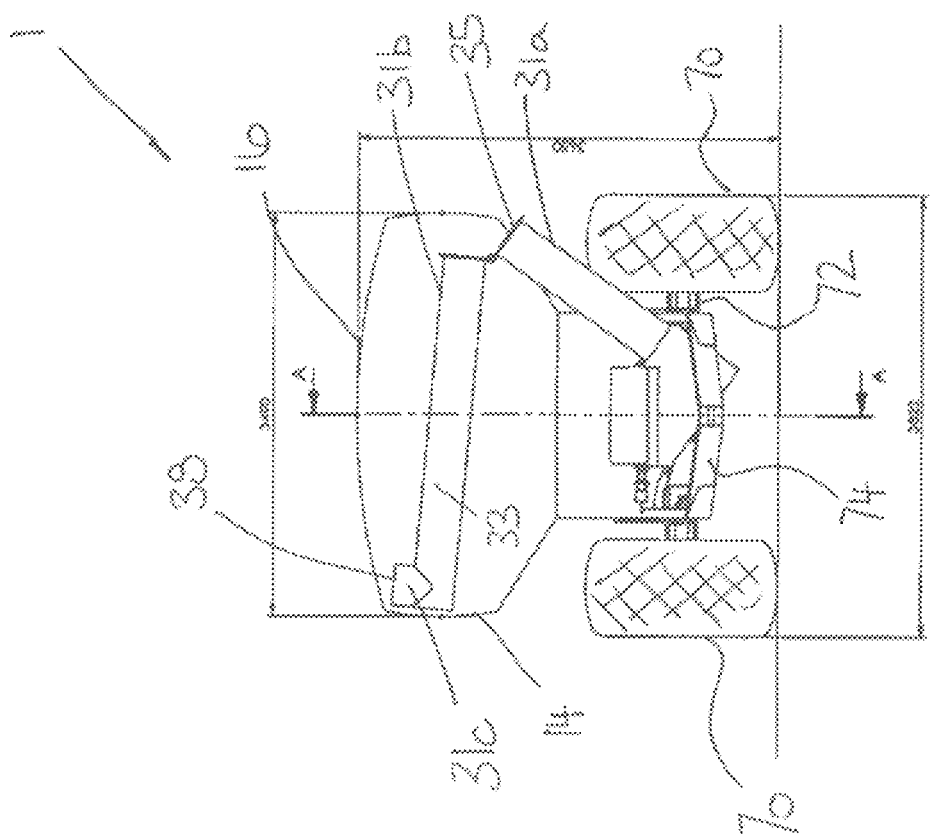
Figure 3B
Figure 3A

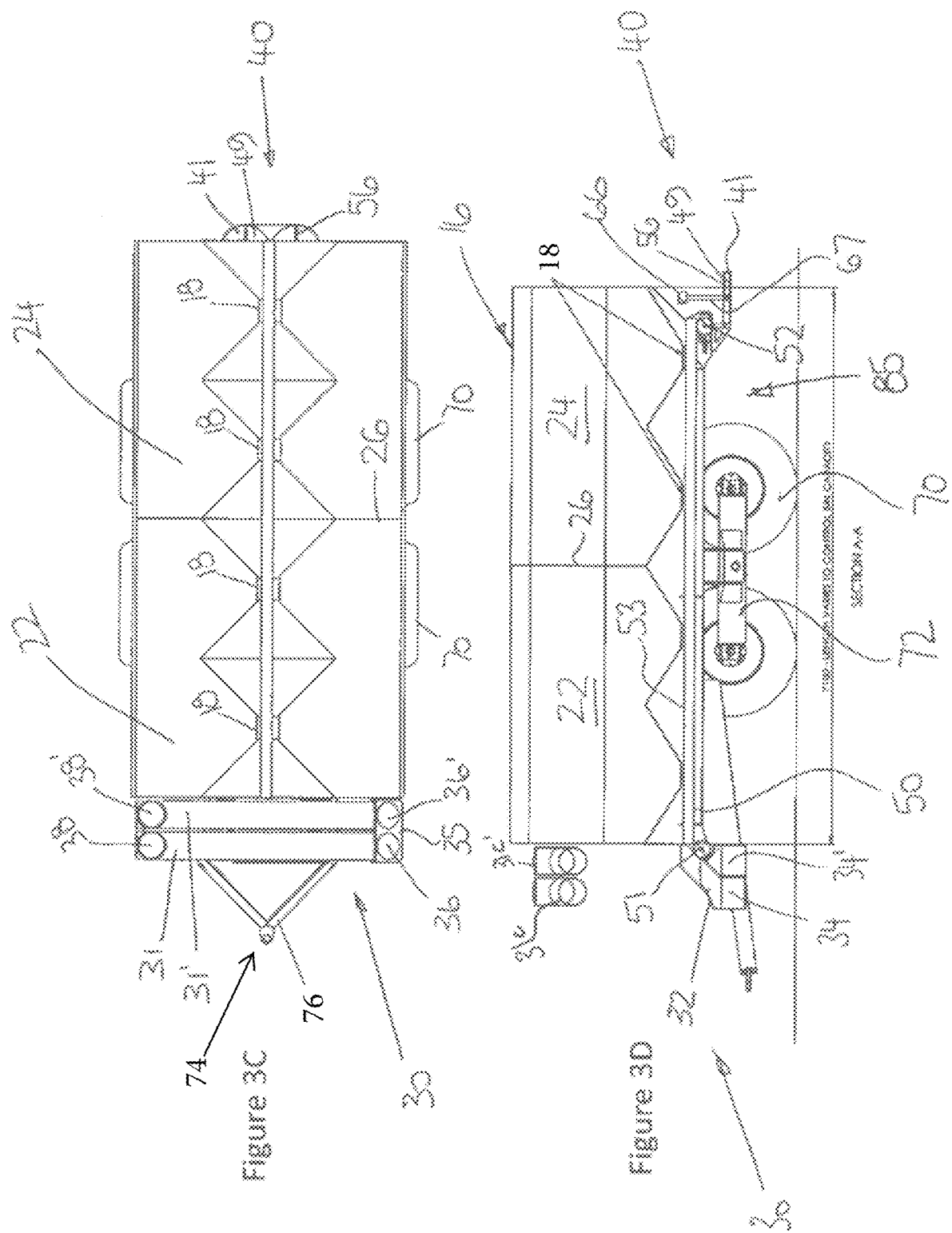

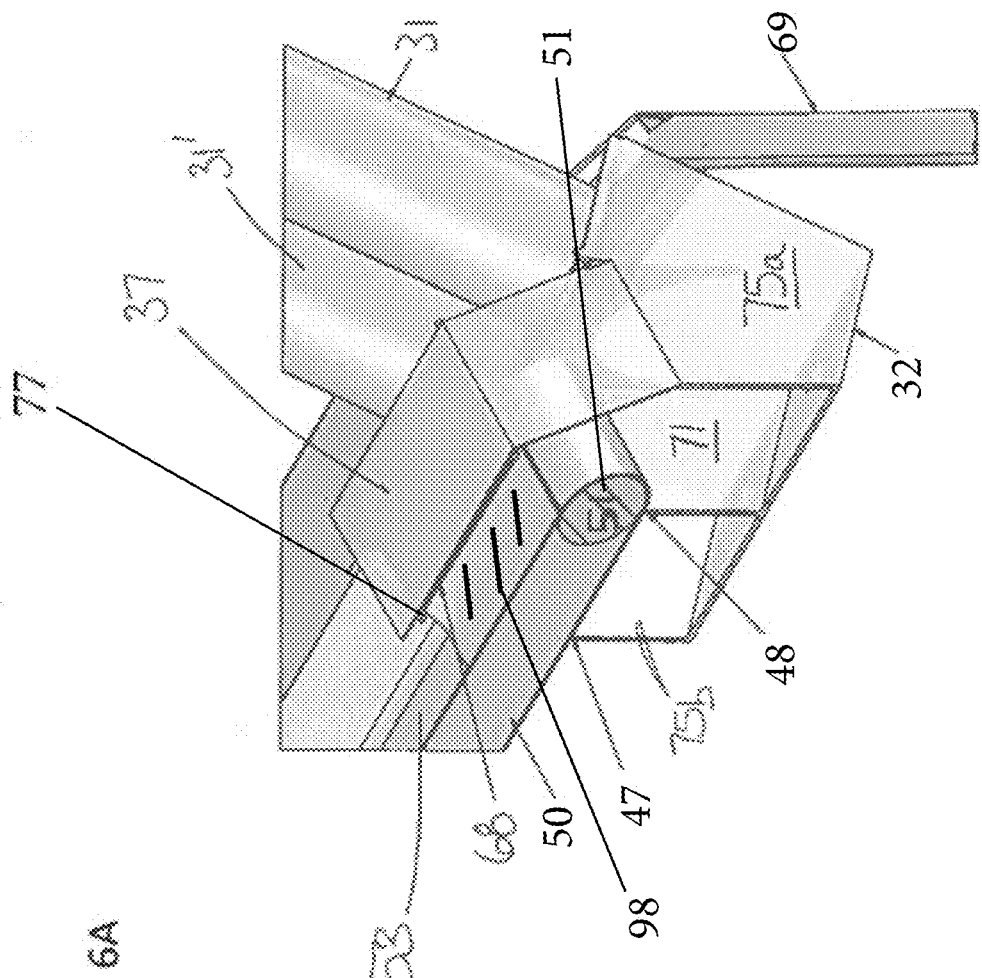

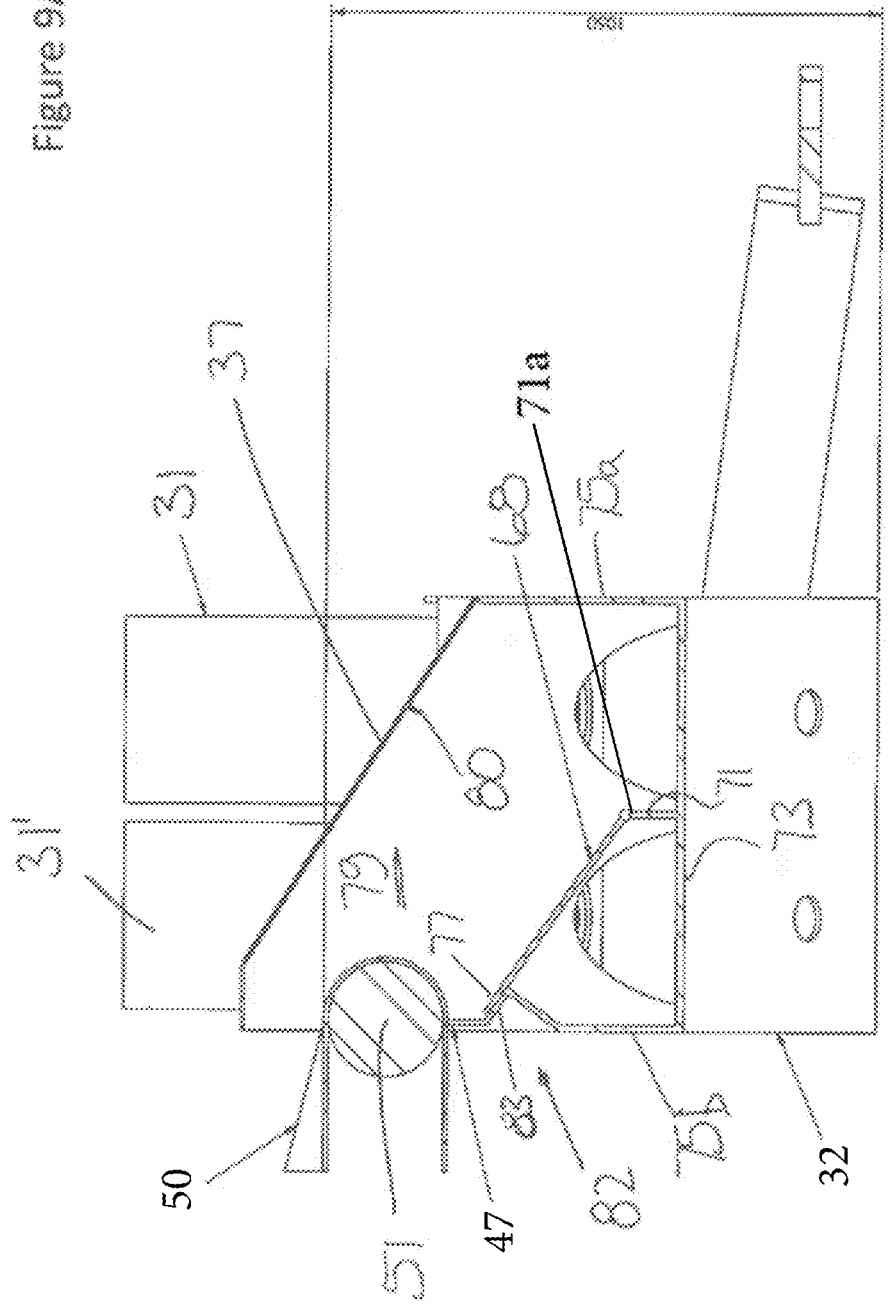

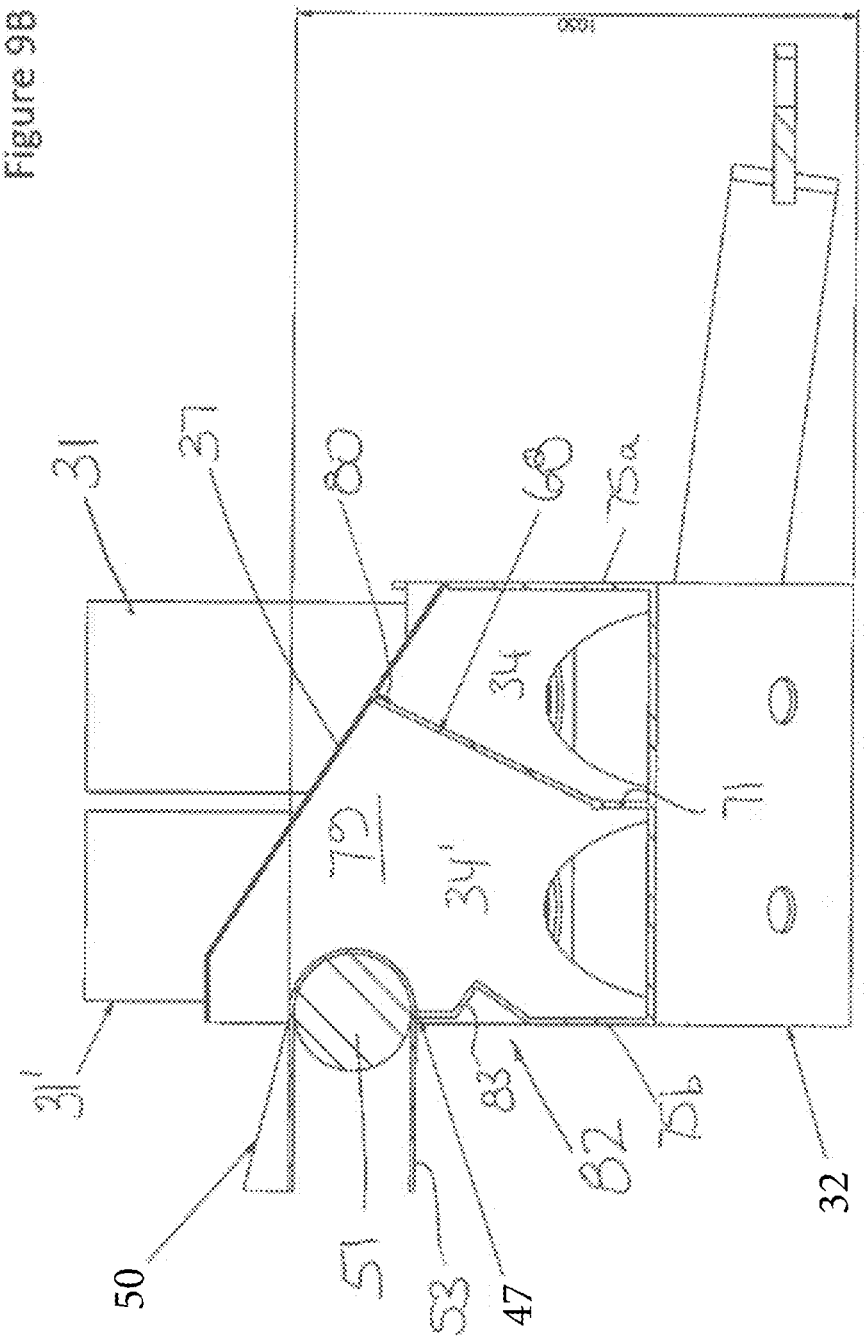

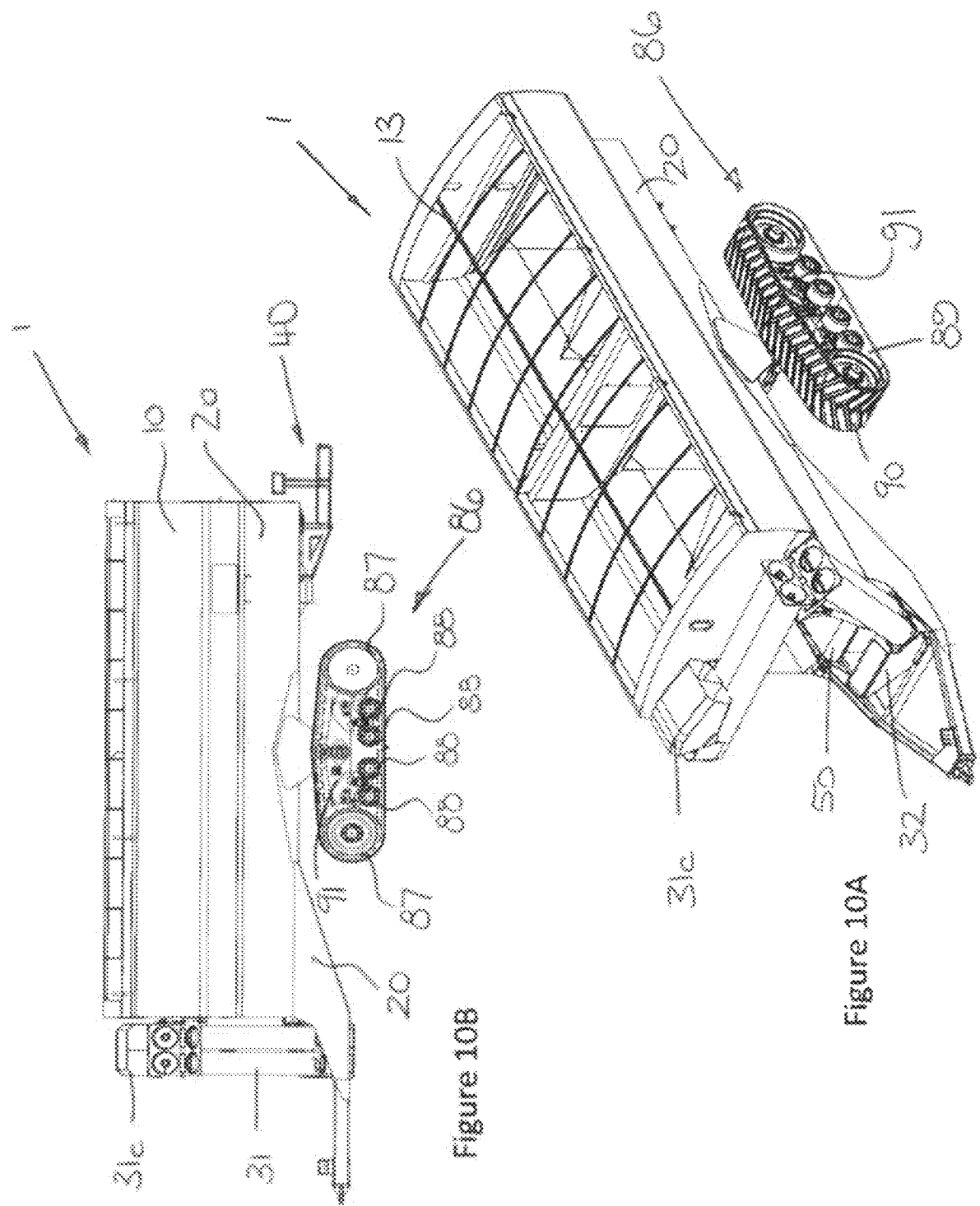

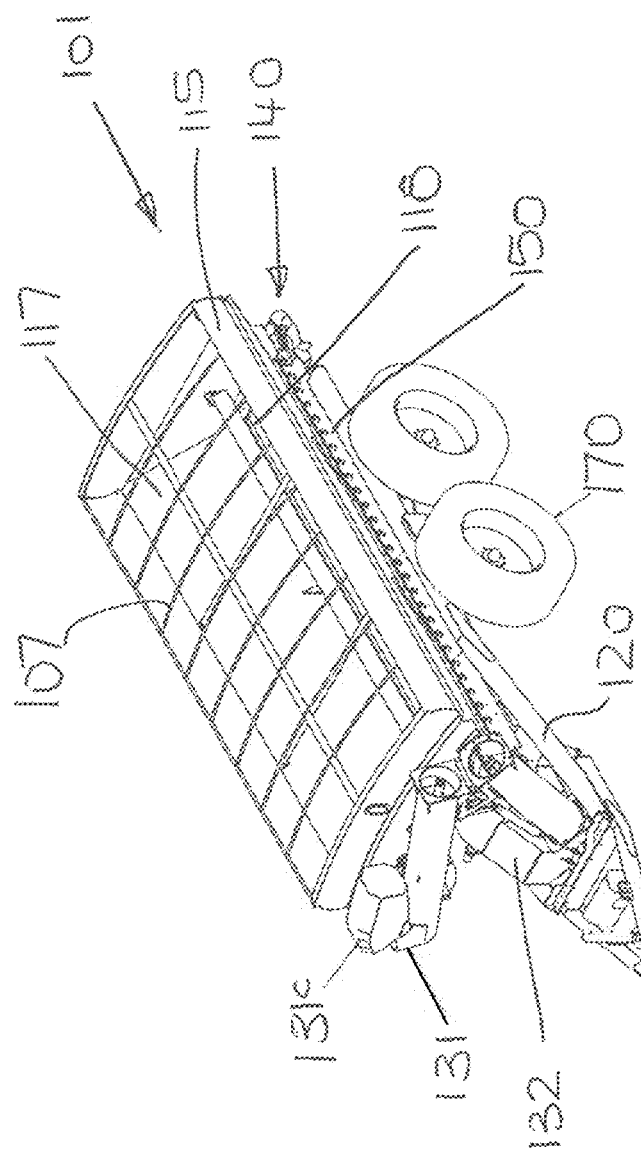
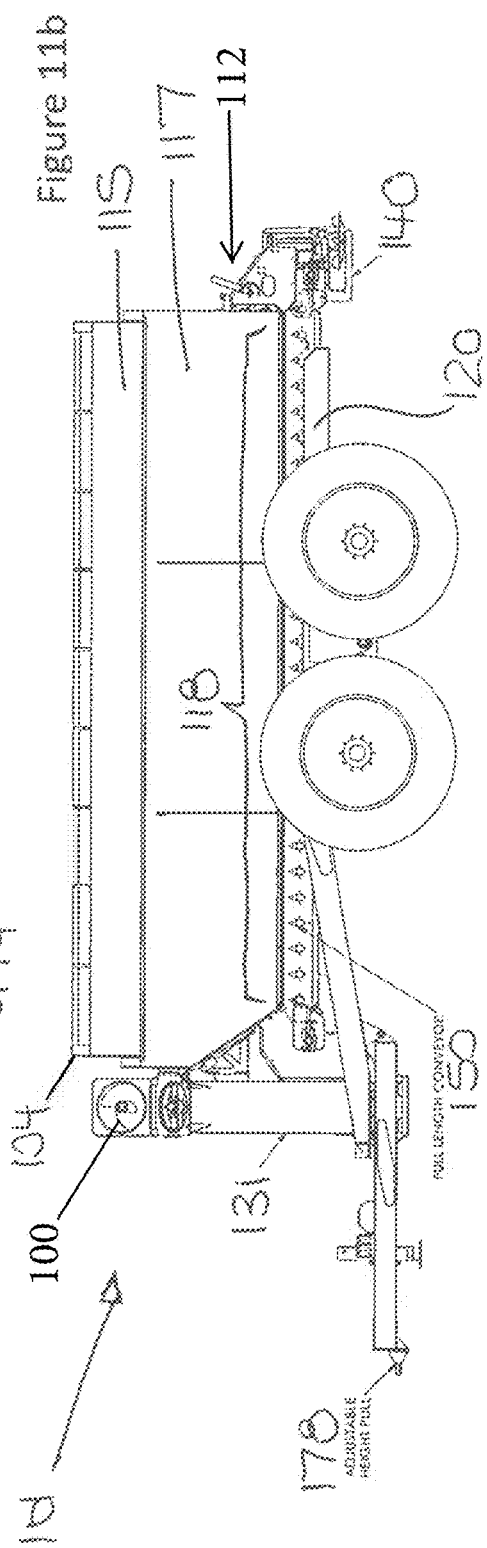

AGRICULTURAL BIN

TECHNICAL FIELD

The invention relates to the field movable agricultural equipment. Specifically, the invention relates to a bin for storing and disbursing agricultural material.

BACKGROUND

Agricultural equipment is expensive but necessary to manage the volumes of product required to support a commercial farming venture.

Where dedicated machinery is required only at specific times in the harvesting cycle, these machines can be left unused for a period of months. This can impose a financial burden on a farm to purchase and maintain equipment that will is only utilised for short periods.

Such pieces of equipment include harvesting and sowing equipment, for example, a chaser bin. The chaser bin is typically used for collecting seed and grain harvested from a harvester. The bin is attached to a prime mover, such as a tractor, and towed in parallel with a combine harvester to receive seed into an open top as it is ejected from the heads of the harvester. Typically, chaser bins can only store a limited amount of material, about 60,000 kg. Once harvested the collected seed and grain is emptied into a storage bin or mother bin, of significantly larger capacity, until it can be processed. After the harvesting process is complete and the harvested crop received in the mother bin, the chaser bin sits dormant, until a subsequent crop is ready for harvesting.

The present invention was conceived with these shortcomings in mind.

SUMMARY OF THE INVENTION

In a first aspect, the invention provides a transportable agricultural bin for storing and dispersing an agricultural material, comprising: a bin body having a compartment for storing the agricultural material, the compartment having an outlet at a lower end thereof; at least one auger and a spreader to disperse the agricultural material; and a conveyor provided under the outlet and extending between the auger and the spreader, wherein the conveyor is configured to selectively transport the agricultural material from the outlet to either the auger or the spreader.

In one embodiment, there is provided an agricultural bin for storing and dispersing a agricultural material, the bin comprising; a body including a base, a side wall and an open top, the base having an outlet therein; a movable frame supporting the body; a pair of dispersement mechanisms disposed at opposing ends of the body; and a conveyor extending between the outlet and the pair of dispersement mechanisms, wherein the conveyor is configured to selectively transport the agricultural material from the outlet to each of the pair of dispersement mechanisms.

The body may have only one outlet that extends along the lower end of the bin body and opens on to the conveyor.

The body may have at least two compartments for separately storing a first agricultural material and a second agricultural material, each of the at least two compartments having a respective outlet at a lower end thereof.

The conveyor may be configured to operably transport the agricultural material to the auger in a first operative mode and the transport agricultural material to the spreader in a second operative mode.

The conveyor may operate to transport agricultural material in opposite directions between the at least one auger and the spreader. The conveyor may extendable towards the collector.

The agricultural material may be a particulate or a flowable material. The agricultural material may be a nonparticulate material or clumping material such as manure or hay.

The spreader may comprise a rotatable member, for disbursing the agricultural material therefrom. The rotatable member may be horizontally orientated. The rotatable member may provide guides or vanes thereon to direct agricultural material contacting the rotatable member. The spreader may comprise a plurality of rotatable members.

A collector may be located adjacent a first end of the conveyor to receive agricultural material from the conveyor. The collector may be configured to provide a single chamber. The chamber may be in communication with an auger. The collector may be configured to provide at least one chamber, such that the or each chamber is respectively in communication with the or each of the at least one auger. Each chamber may receive and retain agricultural material from a designated compartment of the bin via the conveyor. The collector may be configured to provide two chambers, such that a first chamber receives and retains the first agricultural material from one of the two compartments of the bin body and a second chamber receives and retains the second agricultural material from the other of the two compartments of the bin body, via the conveyor.

The transportable agricultural bin may further comprise a guide disposed between the first end of the conveyor and the collector, to guide the first and second agricultural materials from the conveyor to one of the first or second chambers of the collector. The guide may be movably engaged with the collector to transition between a first position for channelling the first agricultural material to the first chamber and a second position for channelling the second agricultural material to the second chamber.

At least one of the guide and the collector includes a scraper to remove agricultural material from the conveyor.

The transportable agricultural bin may further comprise a hopper located adjacent a second end of the conveyor to receive agricultural material from the conveyor. The hopper may be configured to deliver agricultural material to the spreader.

The conveyor may comprise a continuous belt driven around at least two rotatable members. A first rotatable member of the at least two rotatable members may form a leading edge of the conveyor, the first rotatable member being movably mounted to adjust the leading edge of the conveyor relative to the bin body. The conveyor may extend from the collector to the hopper.

At least one sensor is located along the conveyor to measure a height of flowable material on the conveyor. Supplementary sensors may also be located in the hopper and the collector to measure a level of flowable material therein. The at least one sensor and the supplementary sensors may be configured to transmit data recorded on (i) the height of flowable material on the conveyor and (ii) the level of flowable material in the hopper and the collector, as signal data to a receiver. The receiver may then use this data to (i) calculate the volume of flowable material on the conveyor and in the hopper and the collector and (ii) vary the flow rate of flowable material exiting from the bin body, to achieve a predetermined volume of flowable material to be dispersed by the auger or the spreader.

Each closer may be independently controlled. Each closer may be varied in response to the volume of flowable material transported to either the auger or the spreader, to achieve a predetermined volume of flowable material to be dispersed by the auger or the spreader.

Where different flowable materials are stored in each of the two compartments of the bin body, the closer of each outlet may be varied independently to release the different flowable material in a predetermined ratio.

The transportable agricultural bin may further comprise at least one sensor is located along the conveyor to measure a height of agricultural material on the conveyor. The height of agricultural material on the conveyor may be used to calculate a volume of agricultural material transported to either the auger or the spreader.

The bin body and the conveyor may be supported on a frame, the frame comprising at least one of a pair of wheels and a caterpillar track.

In one embodiment, there is provided an agricultural bin for storing and dispersing flowable agricultural material, comprising; a movable bin body for storing agricultural material, the bin including a base having an outlet therein; dispersing mechanisms disposed at opposing ends of the bin body; and a conveyor extending under the outlet and between the dispersing mechanisms, wherein the conveyor selectively transports the flowable agricultural material from the outlet to one or the other of the dispersing mechanisms.

The dispersing mechanisms may comprise at least one auger and a spreader.

In one aspect of the invention, there is provided a trailer, comprising a transportable agricultural bin as described herein.

In a further aspect of the invention, there is provided a vehicle, comprising a transportable agricultural bin as described herein.

BRIEF DESCRIPTION OF THE DRAWINGS

Embodiments of the invention are illustrated by way of example, and not by way of limitation, with reference to the accompanying drawings, of which:

FIG. 1 is a perspective view of a bin according to an embodiment of the invention illustrating a pair of augers disposed at a first end of the bin;

FIG. 2 is a perspective view of the bin of FIG. 1, illustrating a spreader disposed at a second end of the bin;

FIG. 3A is an end view of the first end of the bin illustrating an auger in a transportation configuration;

FIG. 3B is the end view of FIG. 3A illustrating the auger in an operative configuration;

FIG. 3C is a top view of the bin, illustrating the bin with two separate compartments, each compartment having two outlets at a base thereof;

FIG. 3D is a side view of the bin, illustrating a pair of augers at a first end therefor and a spreader at a second end thereof;

FIG. 6A is a perspective view of a partitioned dropper box according to one embodiment of the invention, configured to feed a first auger from the body;

FIG. 9A is a sectional view of the dropper box of FIG. 8A, illustrating the orientation of the dividing wall to feed the first auger;

FIG. 9B is a sectional view of the dropper box of FIG. 8B, illustrating the orientation of the dividing wall to feed the second auger;

FIG. 10A is a perspective view of a caterpillar track for mounting the chassis;

FIG. 10B is a perspective elevation view of the bin of FIG. 1, mounted to a pair of caterpillar tracks;

FIG. 11a is a perspective view of a second embodiment of the agricultural bin, having a single outlet to allow agricultural material to fall directly on a conveyor beneath the opening;

FIG. 11b is a side view of the agricultural bin of FIG. 11a, illustrating the single outlet extending along substantially the entire length of the bin;

Figure 4:
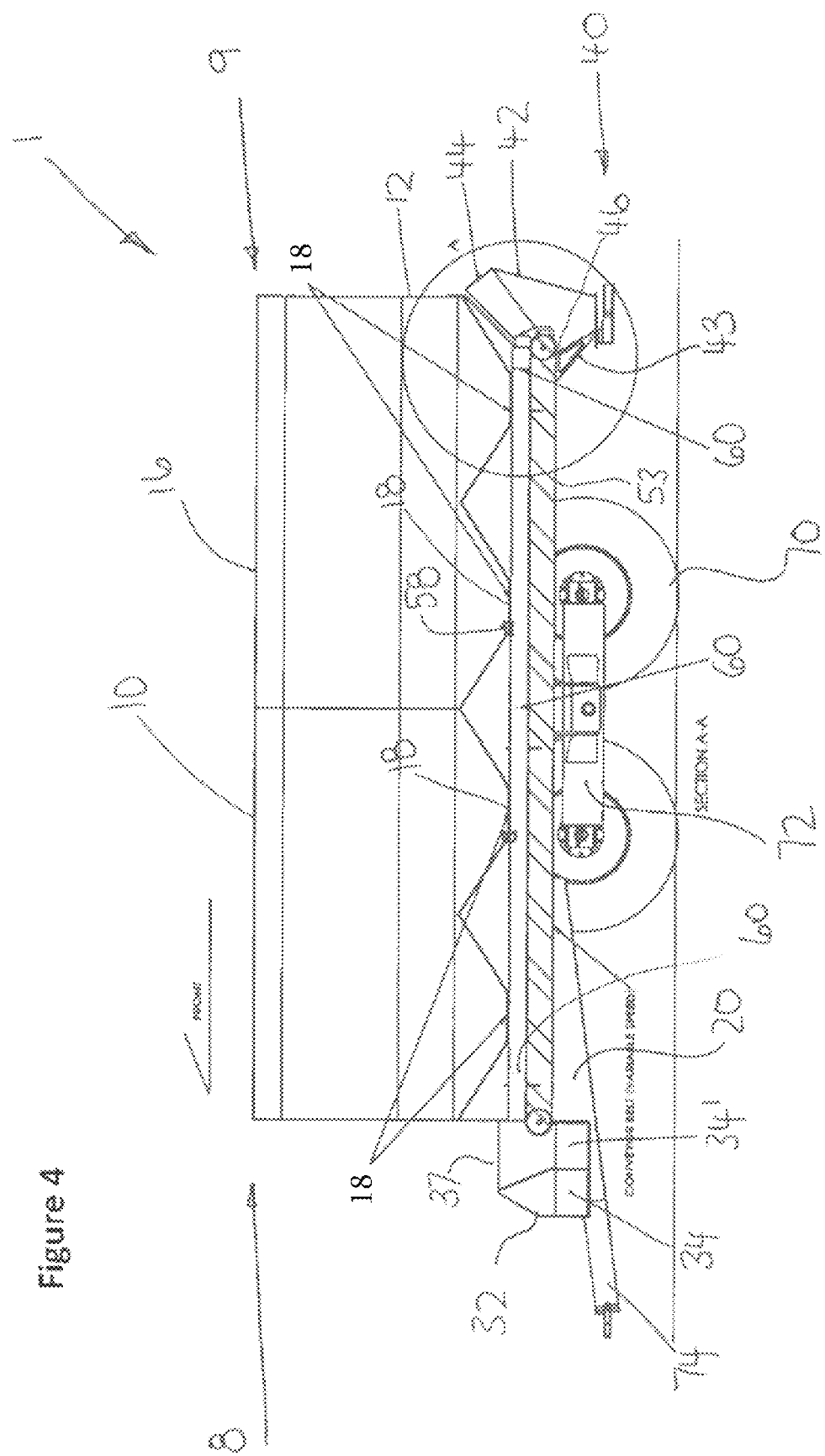
FIG. 4 is a side view of the bin, illustrating a dropper box for feeding the auger and a hopper for feeding the spreader.

Embodiments will now be described more fully hereinafter with reference to the accompanying drawings, in which various embodiments, although not the only possible embodiments, of the invention are shown. The invention may be embodied in many different forms and should not be construed as being limited to the embodiments described below.

DETAILED DESCRIPTION OF EMBODIMENTS

Described herein is an agricultural bin 1 that can be used for multiple agricultural functions. More specifically, the bin can be used for collecting, dispensing and/or spreading agricultural material that would previously have only been achieved using two or more kinds of specialised equipment. The bin 1 described herein is capable of carrying out multiple agricultural functions thereby maximising the usage of the bin. The embodiment of the bin described herein is configured as a trailer for attaching to a prime mover but it is contemplated that the bin can be configured as a vehicle to be independently driven. It is further contemplated that the bin could be used for the storage and disbursement of non-agricultural materials as applicable to industries outside of farming.

With reference to FIG. 1, there is illustrated a transportable agricultural bin 1 for storing and dispersing an agricultural material, comprising: a bin body 10 having a compartment 11 for storing the agricultural material, the compartment having an outlet 18 at a lower end thereof; at least one auger 31 and a spreader 40 to disperse the agricultural material; and a conveyor 50 provided under the outlet 18 and extending between the auger 30 and the spreader 40, wherein the conveyor 50 is configured to selectively transport the agricultural material from the outlet 18 to either the auger 31 or the spreader 40.

The body 10 includes a base 12, a side wall 14 and an open top 16, the base 12 having an outlet 18 therein. The illustrated bin 1 is transportable and comprises a movable frame 20 supporting the body 10 thereon. Dispersing mechanisms 30, 40 are disposed at opposing ends 8,9 of the body, and there is a conveyor 50 extending under the outlet 18 and between the dispersing mechanisms 30, 40, wherein the conveyor 50 transports the agricultural material from the outlet 18 to one or the other of the pair of dispersing mechanisms 30, 40.

By having at least two dispersing mechanisms accessed by the conveyor means that material in the bin body can be selectively conveyed to the dispersing mechanisms and dispersed according to the nature of the dispersing mechanism. For example, the dispersing mechanisms could comprise an auger and a spreader. In one function, the bin would allow agricultural material such as harvested grains to be conveyed to the auger for delivery into a larger bin, such as a road train. In another function the same bin could provide for seeds stored in the bin body to be dispensed onto the conveyor and conveyed to the spreader for seeding into prepared soil. "Agricultural material" as referred to herein is intended to encompass both edible and non-edible materials that require gathering and/or distribution within a harvesting cycle; for example, seed, grains, beans, fertilizer, pellets, and the like.

As illustrated in FIGS. 1 and 2, the body 10 has a rectangular cross-sectional form that is longer in length than in width. It is contemplated that the body 10 can be extended in length to increase a volume of an internal cavity 11 therein, and thereby increase the usable capacity of the body 10.

In one embodiment, it is contemplated that the body 10 can be cylindrical, comprising only a single cylindrical side wall 14. However, a cylindrical body 10 can only be increased in volume by increasing the height of the body 10, which may reduce overall stability of the bin 1 during transportation.

In FIG. 1, the body 10 provides an open top 16, which facilitates receiving agricultural material into the cavity 11. The bin 1 can be self-propelled or attached to a prime mover to move alongside a combine harvester (not illustrated) and receive a harvested agricultural material directly from the heads of the harvester.

For receiving harvested agricultural material, the top 16 is open to minimise the opportunity for spilled and thus wasted material. A tarpaulin or similar flexible cover 4 is provided for shielding the open top 16 of the bin 10 and protecting the agricultural material therein from rain, wind and other environmental factors. The cover 4 is manually rolled over the top 16 of the bin 10 by an arm 5 attached to a centre spindle (not shown) of the rolled cover. The other end of arm 5 opposite to the end attached to the cover 4 is stored at mount 6 when not in use. The cover 4 is fixed to a first side 2 of the bin and can be drawn across the open top 16 by removing the arm 5 from mount 6 and pulling it over open top 16. The cover 4 can be made from a plasticised material to provide a shield from water. A more durable hard cover (not illustrated) can be used to close the open top 16 and protect the contents of the body 10. The hard cover can provide a seal that provides better protection from moisture and pests getting into the stored agricultural material.

A central beam 13 spans the length of the body 10 from a first end 8 to a second end 9. The beam 13 provides a support for the cover 4 when drawn across the open top 16.

The body 10 provides side walls 14 that define the cavity 11 therebetween. The side walls 14 have a straight portion 15 and an inclined portion 17 wherein the inclined portions 17 define the base 12. The inclined portions 17 of the base 12 funnel the agricultural material towards the outlet 18 in the base 12 of the body 10.

The body 10 illustrated in FIGS. 1 and 2 is divided into two separate compartments 22, 24. It is contemplated that more than two separate compartments could be created in the body 10 by using a plurality of dividing walls 26. A single dividing wall 26 is illustrated in FIGS. 1 and 2 to create compartments 22 and 24. The compartments 22, 24 can receive and/or store two non-similar agricultural materials, wherein the wall 26 prevents cross-contamination between the materials. In some circumstances the body 10 can be used to store the same agricultural material in each of the compartments 22, 24. An aperture 28 is provided in the wall 26 that allows communication between the two compartments 22 and 24, where cross-contamination or mixing of agricultural materials is not of a concern.

A top edge 27 of the wall 26 is rounded and protrudes outwardly from the bin 10. The outwardly extending edge 27 reduced the opportunity for cross-contamination between the compartments 22 and 24 when the cavity 11 is filled to capacity.

The compartments 22 and 24 each provide a pair of outlets 18 (illustrated in FIG. 3C). While one outlet is illustrated per compartment, more outlets may be provided for each compartment, if desired for a particular storage and dispersing application. These multiple outlets facilitate a more even and steady flow of agricultural material from each of the compartments 22, 24. The base 12 of the body 10 is configured to undulate to form a number of funnel-features across the base 12, each funnel terminating in an outlet 18 at a lowermost point thereof. The location of the outlets 18 in each compartment 22, 24 facilitates emptying of the compartments 22, 24 and minimising agricultural material left behind. This in turn minimises waste and also minimises the opportunity for cross-contamination where a first agricultural material residue remains in the compartment 22, 24 prior to receiving a second agricultural material.

Each outlet 18 is positioned in a lowermost portion of the respective compartment 22, 24 to facilitate the agricultural material travelling through the body 10 under the force of gravity.

Figure 5:
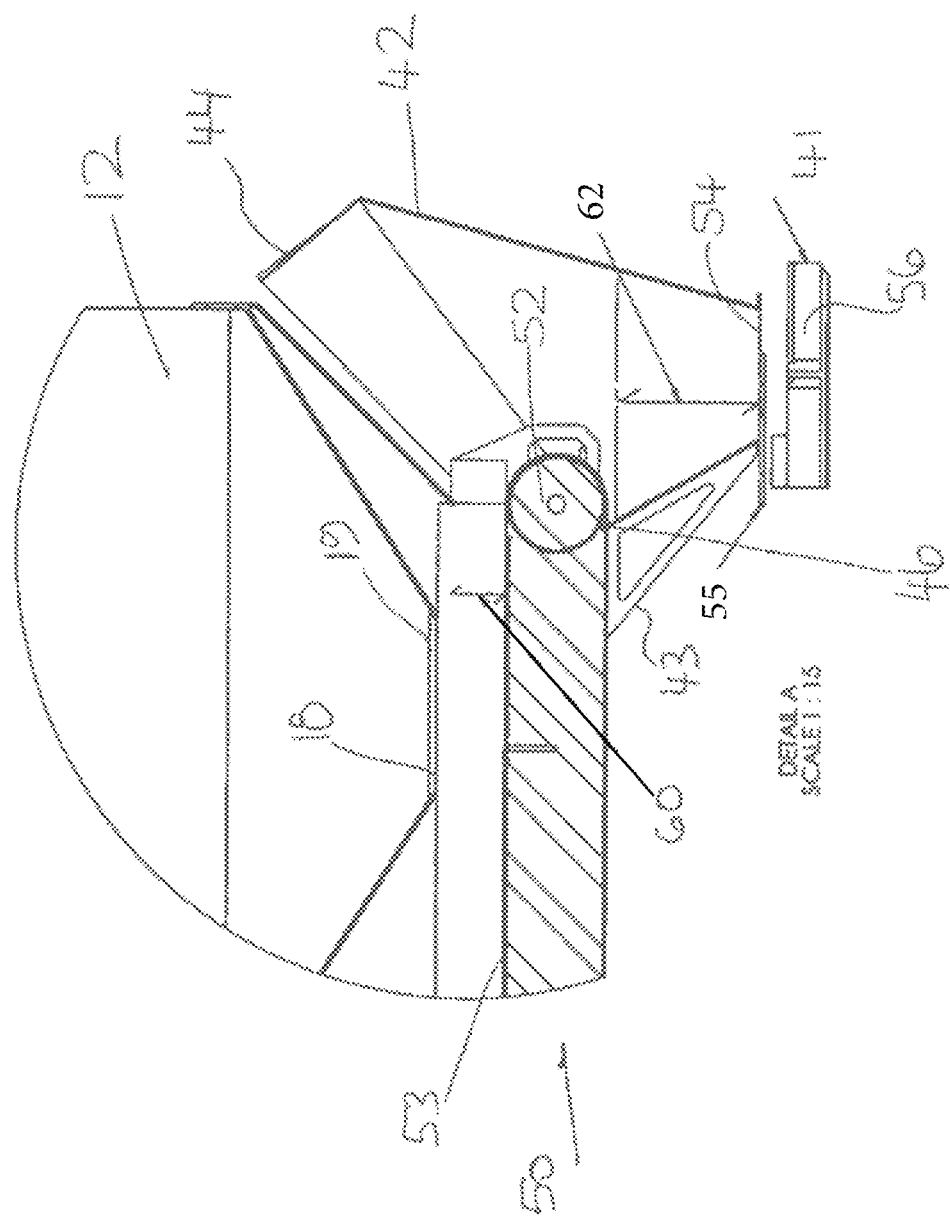
FIG. 5 is an enlargement of circle A from FIG. 4, illustrating a sensor location on the conveyor for monitoring feed rates to the hopper.

Each outlet 18 is coupled to a closer illustrated in FIG. 5 as a door 19. The door 19 is movable between a fully open and a fully closed configuration and can be positioned at intervals between fully open and fully closed, to thereby impede the flow of agricultural material exiting the outlet 18 and thereby acts as a flow regulator. The door 19 can be pivotally or slidably disposed across the outlet 18. The opening and closing motion of the door 19 can be controlled by a signal from a computer, where the signal from the computer is generated in response to a sensor input that monitors a height of the agricultural material on the conveyor 50, during use.

An actuator 58 is located in proximity to the door 19 to vary the location of the door 19 relative to the outlet 18 and thereby adjust the output flow rate from the outlet 18.

A first sensor 60 is located along the conveyor 50 to monitor the height of the agricultural material on the conveyor 50 and thereby calculate the output volume of agricultural material collectively from the at least one outlet 18.

This output volume is the volume of agricultural material that is delivered to and subsequently dispersed from either of the dispersing mechanisms 30, 40 at opposing ends 8, 9 of the body 10.

The first sensor 60 sends an input signal to a computer either on-board the bin 10 or remotely located. The computer uses the input signal to calculate the volume of the output along the conveyor 50. The computer can send an output signal to the actuator 58 to vary the door 19 and thus increase or reduce the output flow rate of agricultural material from the outlet 18. A separate actuator 58 is coupled to each of the plurality of door 19 in association with each of the plurality of outlets 18.

A second sensor 62 is located in proximity to the dispersing mechanism 40 to monitor the volume of agricultural material being dispersed.

A third sensor 64 is located in proximity to the dispersing mechanism 30 to monitor the volume of agricultural material being dispersed.

As discussed above, the agricultural bin 1 is movable, whether it is towed or self-driven. In the described embodiment the frame on which the bin is supported is illustrated in detail in FIG. 4 as chassis 20.

The chassis 20 provides a structural support for co-locating and mounting each of the conveyor 50, the dispersing mechanism 30, 40 and a pair of wheels 70.

The wheels 70 are mounted to the chassis 20 via a suspension unit 72. The suspension unit 72 provides stability to the bin 1 when traversing uneven field and unsealed agricultural terrain. The suspension unit 72 also improves handling characteristics of the bin 1 when on a sealed road surface.

At the front of the chassis 20 is a coupling member 74 for attaching the chassis 20 to a prime mover when the bin is not self-propelling. The coupling member 74 is configured in a triangular form where two bar-members 76 converge on one another at distal ends thereof, to form a mounting point 78 which can be received by a tow bar of the prime mover. The opposing ends of the bar-members 76 extend outwardly while diverging from one another to be coupled to opposing sides of the chassis 20. In FIG. 4 the coupling member 74 is illustrated coupled to the chassis 20.

The chassis 20 is manufactured from a structural material such as steel or aluminium to provide the necessary structural strength and rigidity for supporting the body 10 when fully loaded with agricultural material.

In one embodiment illustrated in FIGS. 10A and 10B, the chassis 20 is mounted on a caterpillar track 86 and not wheels 704. The caterpillar track 86 comprises a pair of primary wheels 87 at opposing ends of the track and a plurality of secondary wheels 88 disposed between each wheel of the primary pair of wheels 87.

Each primary wheel 87 and secondary wheel 88 is movably coupled to at least one other wheel to form an adjustable suspension system 91. The primary 87 and secondary wheels 88 can be adjusted relative to one another to vary the ride height of the chassis 20 and to vary a rolling length of the caterpillar track 86. This adjustment also facilitates the tensioning of the caterpillar track 86.

A durable, flexible belt 89 is mounted about the primary wheels 87 encasing the secondary wheels 88 therein. The belt 89 can be made from rubber or other elasticised material. The belt 89 can comprises a plurality of protrusions 90 extending outwardly therefrom to improve grip and handling of the bin 1. The protrusions 90 can comprise studs or spikes to assist the bin traversing rough terrain; or a tread pattern to provide grip on sealed and unsealed surfaces. It is contemplated that a width of the belt 89 could range from between 20 inches to 40 inches.

A pair of continuous tracks 86, 86', also referred to as a trailed track system, can be mounted to either side of the chassis 20. A pair of tracks 89, 89' provides more stability to the bin 1 when traversing rough and uneven ground.

A wider belt 89 will be selected to distribute a higher load bin 1. For example, a 30 tonne bin can use a pair of caterpillar tracks 86, 86' having a belt width of 25 inches, while a 45 tonne bin can use a pair of caterpillar tracks 86, 86' having a belt width of 30 inches.

At least partially mounted to the chassis 20 at the first end 8 of the body 10 there is provided a collector, illustrated in FIG. 1 as a dropper-box 32. At least partially mounted to the chassis 20 at the second end 9 of the body 10, there is provided a hopper 42. Each of the dropper-box 32 and hopper 42 are configured to receive agricultural material from the conveyor 50 to each feed one of dispersing mechanisms 30, 40.

The conveyor 50 extends along an underside 85 of the body 10 and selectively conveys agricultural material to one or the other dispersing mechanism 30, 40. In one embodiment the conveyer can run in a first direction to convey material to one dispersing mechanism or driven to run in the opposite direction to deliver material to the other dispersing mechanism located at the opposite end of the bin body. Alternatively, multiple conveyors may be employed for each dispersing mechanism.

The conveyor 50 extends from the dropper-box 32 at the first end 8 of the body 10 to the hopper 42 at the second end 9 of the body 10. The conveyor 50 is positioned to receive and catch agricultural material exiting the outlets 18 in the base 12 of the body 10.

As discussed above, while the preferred embodiment has a single conveyor that can operate in opposing directions, in some embodiments the conveyor 50 can comprise two conveyors 50 disposed side-by-side to provide two parallel flow paths for the agricultural material. The two conveyors 50 can be configured to each feed a separate chamber 34, 34' of the dropper-box 32 to reduce the opportunity of cross-contamination between non-similar agricultural materials in each of the compartments 22, 24.

In FIGS. 1-9 a single conveyor 50 is illustrated for conveying/transporting agricultural material from each of the compartments 22, 24 individually or simultaneously from the body 10 to either of the dispersing mechanism 30, 40.

When compartments 22, 24 contain the same material the opportunity for cross-contamination is eliminated between the two compartments. However, when non-similar agricultural materials are dispersed via the dispersing mechanisms 30, 40, the feed of agricultural material from each compartment is separately maintained.

The conveyor 50 comprises a pair of rollers at opposing ends thereof. A first roller 51 is disposed at the first end 8 of the body 10 immediately adjacent the dropper-box 32. A second roller 52 at the second end 9 of the body 10 is disposed immediately adjacent the hopper 42.

A belt 53 is disposed continuously about the first and second rollers 51, 52 to create a continuous, seamless conveyor 50 for transporting agricultural material to the pair of dispersing mechanism 30, 40. The belt 53 can be made from a resilient material, and is preferably hard wearing and durable.

A third roller (not illustrated) can be placed between the first 51 and second 52 rollers to act as a tensioner. The first 51 and second 52 rollers define a plane therebetween to which the belt 53 runs parallel. The third roller is movable in relation to the plane, to thereby increase or decrease the tension on the belt 53 in use, to ensure that any slack in the belt can be adjusted for. Alternatively, first roller 51 or second roller 52 may be moved to change the tension on the belt.

In one embodiment, both the first roller 51 and the third roller can be movable to vary the flow path of the conveyor 50. This embodiment will be described in more detail in relation to FIGS. 7A and 7B where the first roller 51 is movable in relation to the dropper-box 32 to deposit agricultural material is the pre-selected chamber 34, 34'.

A first scraper seam (also referred to as a 'seal') 46 is incorporated into at least one of the hopper 42 and the hopper mounting frame 43. The scraper seam 46 is positioned immediately adjacent an outer surface 53a of the belt 53. As the continuously looping belt 53 runs over the second roller 52 to travel back towards the first roller 51, the belt surface 53a is pulled across the first scraper seam 46 to dislodge and remove any agricultural material adhered to the surface 53a, thereby cleaning the belt 53 as it exits the hopper 42.

The scraper seam 46 can comprise a rigid member held at a predetermined distance off the belt to remove agricultural material adhered to the surface 53a. The scraper seam 46 can comprise a brush or flexible wiper blade to remove agricultural material from the belt surface 53a. Combinations of a rigid member, brush and flexible member can also be used along the scraper seam 46.

A first sensor 60 is positioned along the length of the belt 35 to monitor the height of the agricultural material upon the conveyor 50 at a given time. A plurality of first sensors 60 can be positioned along the belt 53 to provide a more accurate estimate of the amount of agricultural material on the conveyor 50 at a given time.

As the agricultural material travels along the conveyor towards the second end 9 of the body 10, it is deposited into the hopper 42 which feeds the spreader 40. A mouth of the hopper is open and is surrounded by a skirt 44 that guides the agricultural material coming off the belt 53 towards the spreader 40. The hopper 42 has an inclined wall that guides the agricultural material towards a hopper outlet 54 in a lowermost portion thereof. When the conveyor 50 is operating, the agricultural material can be ejected from the belt 53 outwardly as well as downwardly. The skirt 44 catches any agricultural material dispersed outwardly and channels it into the waiting hopper 42.

The hopper outlet 54 is sealable with a hopper gate 55, which slides across the hopper outlet 54. The hopper gate 55 can be positioned to totally seal the outlet 54, and can be moved away from the outlet 54 to fully open the outlet 54. The hopper gate 55 can be positioned between the fully open and fully sealed configurations to vary the amount of agricultural material released therefrom, to the spreader 40.

Within the hopper 42 there is located a second sensor 62 that measures the level to which the hopper is filled with agricultural material. With knowledge of the volume of the hopper 42 at different heights, measuring the height of the agricultural material within the hopper 42 will provide a real time measure of the volume of agricultural material in the hopper 42 at a given time.

Where only one conveyer is used, the user will determine which direction the conveyor 50 will operate in, and thereby determine which of the dispersing mechanisms 30, 40 will be fed. This can be achieved with a reversible drive to the rollers 51, 52, to change their rolling operating direction.

The spreader 40, generally referred to above as the second dispersing mechanism, is located at the second end 9 of the body 10 and comprises at least one rotatable member, illustrated as disc 41 in FIG. 3D. The disc 41 is rotatably supported below the outlet 54 of the hopper 42 to received agricultural material therefrom. As the agricultural material falls onto the rotating disc 41 the agricultural material is captured, and accelerated off the disc 41 to be dispersed in a 360 degrees trajectory off a planar surface 49 of the disc 41.

The surface 49 can comprise one or a plurality of vanes 56. The vanes 56 assist in catching the agricultural material as it falls onto the disc 41 and directing the agricultural material radially outwards from the disc 41.

FIG. 2 illustrates a pair of discs 41, with four vanes 56 on each disc surface 49, the vanes 56 defining a cross formation upon the surface 49. In some embodiments the vanes 56 can form a spiral formation, where each vane 56 curves from a central point on the disc surface 49 outwardly towards a periphery of the disc 41.

Also illustrated in FIG. 2 is a drive mechanism 66 for driving the rotating motion of the pair of discs 41. The drive mechanism 66 can be driven by a motor (not illustrated) or can be driven off other mechanisms of the bin 1, such as the conveyor 50.

The drive mechanism 66 has two driven spindles 67, each extending from the drive mechanism 66 to a central location respectively, on each of the discs 41 of the spreader 40. The spindles 67 can rotate the discs 41 through a range of different speeds depending on the type of agricultural material to be distributed and the amount of agricultural material to be distributed.

The conveyor 50 can be fed from one or both of the compartments 22, 24 of the body 10 to fill the hopper 42. The compartments may store and disperse any two different types of granular products (or even the same product). For example, there may be a seed in the first compartment 22 and a fertiliser in compartment 24, where the fertiliser-to-seed ratio is to be spread 70:30. The outlets 18 of each compartment 22, 24 can be configured (using the associated movable doors 19) to release the agricultural material from each of the compartments 22, 24 in the desired ratio. This ratio of non-similar agricultural materials is then fed along the conveyor 50 directly to the hopper 42, to be dispersed from the rotating discs 41. This farming operation would typically require multiple passes over the same ground: (1) to distribute the seed; and (2) to distribute fertilizer.

The spreader 40 is located under the second end of the conveyor 50 and is coupled to the chassis 20 by a spreader mounting frame 43, illustrated in FIG. 5. The spreader mounting frame 43 can be integrally formed with the chassis 20 or can be separately manufactured and mounted to the chassis 20. A separate mounting allows the spreader mounting frame 43 and spreader to be disengaged from the chassis 20 for replacement, cleaning or maintenance.

At the first end 8 of the body 10 there is disposed the first dispersing mechanism 30, which as discussed previously can comprise a single auger 31 or more than one auger, which moves agricultural material up to a height from which the material can exit the auger and transfer into another apparatus, for example, a larger transport container. Two augers 31, 31' are provided in the embodiment illustrated.

The auger 31 comprises three portions: a base portion 31a, an upper portion 31b; and a head 31c, illustrated in FIG. 3A. The base portion 31a can be either fixed or movable and typically remains coupled to the body 10. The upper portion 31b is pivotably mounted to the base portion 31a and can be pivoted about the base portion 31a. In FIG. 3A the base portion 31a is pivotally mounted to the upper portion 31b via a hinge 35. The hinge 35 can be attached to an external surface 33 of the auger portions 31a, 31b.

In one embodiment the hinge comprises a pair of hinged flanges each of which circumvents a portion 31a, 31b of the auger, such that when the base portion 31a and the upper portion 31b are co-axially aligned, thereby defining an operational configuration of the auger 31, the pair of hinged flanges are brought together. When the auger 31 is not required, the hinged flanges are uncoupled to allow the upper portion 31b to pivot away from the base portion 31a, thereby defining a stowage or transportation configuration for the auger 31.

When more than one auger 31 is located at the first end 8 of the body 10, both augers 31, 31' will have similar features and the hinge 35 can be configured to accommodate a plurality of upper portions 31b to be pivotally coupled to a plurality of base portions 31a, as illustrated in FIG. 1.

Both the base portion 31a and the upper portion 31b have the same cross-sectional area, and when co-axially aligned, form a single internal passage 36 for transporting agricultural material between the dropper-box 32 and the head 31c of the auger 31. The internal passageway 36 can have a circular cross-section; ovoid cross-section, square cross-section; rectangular cross-section or triangular cross-section; however, the passageway 36 should be free from any internal projections to avoid obstructing or blocking the flow of agricultural material from the dropper-box 32.

The head 31c of the auger 31 can provide a fixed outlet 38 for ejection of the agricultural material. The outlet 38 has a cross-sectional area substantially the same as a cross-sectional area of the passageway 36 to avoid blocking the exiting agricultural material. In some embodiments the outlet 38 can have a larger cross-sectional area than that of the passageway 36 to ensure that the auger 31 does not become blocked or backed-up.

The head 31c in some embodiments is pivotally mounted to the upper portion 31b of the auger 31. The pivoting motion of the head 31c (illustrated in FIG. 10A) does not expose or sever the passageway 36 therein, but instead allows the outlet 38 to be directed in a desired direction, thus providing a level of control over the trajectory of agricultural material exiting the auger 31.

In FIGS. 1, 2, 3C and 3D the first dispersing mechanism 30 is illustrated as a pair of folding delivery augers 31, 31'. Each auger 31, 31' corresponds to and services a predetermined compartment 22, 24 of the body 10 to minimise cross-contamination of non-similar agricultural materials within the body 10.

The augers 31, 31' are both fed from the same dropper-box 32 located at the end of the conveyor 50. The dropper-box 32 is divided into individual chambers 34, 34' each chamber configured to receive agricultural material from one of the designated compartments 22, 24, illustrated in FIG. 3D.

The dropper box 32 has an internal cavity 72, divided into a plurality of chambers 34, 34'. FIG. 6A illustrates a pair of chambers 34, 34' however, it is contemplated that additional chambers could be incorporated into the dropper-box 32 without departing from the invention disclosed herein.

The conveyor 50 in FIG. 6A is illustrated as having projections 98, extending from the surface thereof. These projections or cleats can be configured as diagonal lines or chevrons rising up across the surface of the belt 53 to assist in holding the agricultural material on the belt. Alternatively, the cleats may be formed as indents into the surface of the belt 53. A plurality of cleats may be dispersed across the surface of the belt, to give a tyre-tread like appearance.

The first chamber 34 is dedicated to feeding the first auger 31 and the second chamber 34' is dedicated to feed the second auger 31'.

The dropper-box 32 has a base 73 that is configured to have a W-shaped cross-section, thereby providing a pair of outer walls 75a, 75b and a central wall 71 that divides the base 73 into two approximately even chambers 34, 34'. The base 73 is inclined to urge agricultural material received within the dropper-box towards an optimum feeding inlet of each auger 31, 31'. This helps to prevent agricultural material from accumulating in non-accessible regions of the dropper-box 32. The internal helical screw of each auger 31, 31' is not represented in the accompanying illustrations, however, it is understood that a leading edge of the helical screw of each auger 31, 31' will be placed into the agricultural material within the respective chamber 34, 34' of the dropper-box 32 and therefrom transferred along the internal passages 36 to the auger outlets 38, 38'.

Each chamber 34, 34' is partially enclosed by an upper shield 37 that shields the chambers 34, 34' therein.

The chambers 34, 34' are selected to receive agricultural material from the conveyor 50 by positioning of a movable guide illustrated in FIG. 6A as a splitter plate 68.

The splitter plate 68 is pivotally coupled to the shield 37 and rotates between a first position in which the first chamber 34 is fed from the conveyor 50, and a second position where the second chamber 34' is fed from the conveyor 50.

The splitter plate 68 in FIG. 6A illustrates a location of the splitter plate 68, wherein the splitter plate 68 is located for filling the first chamber 34.

Figure 6B:
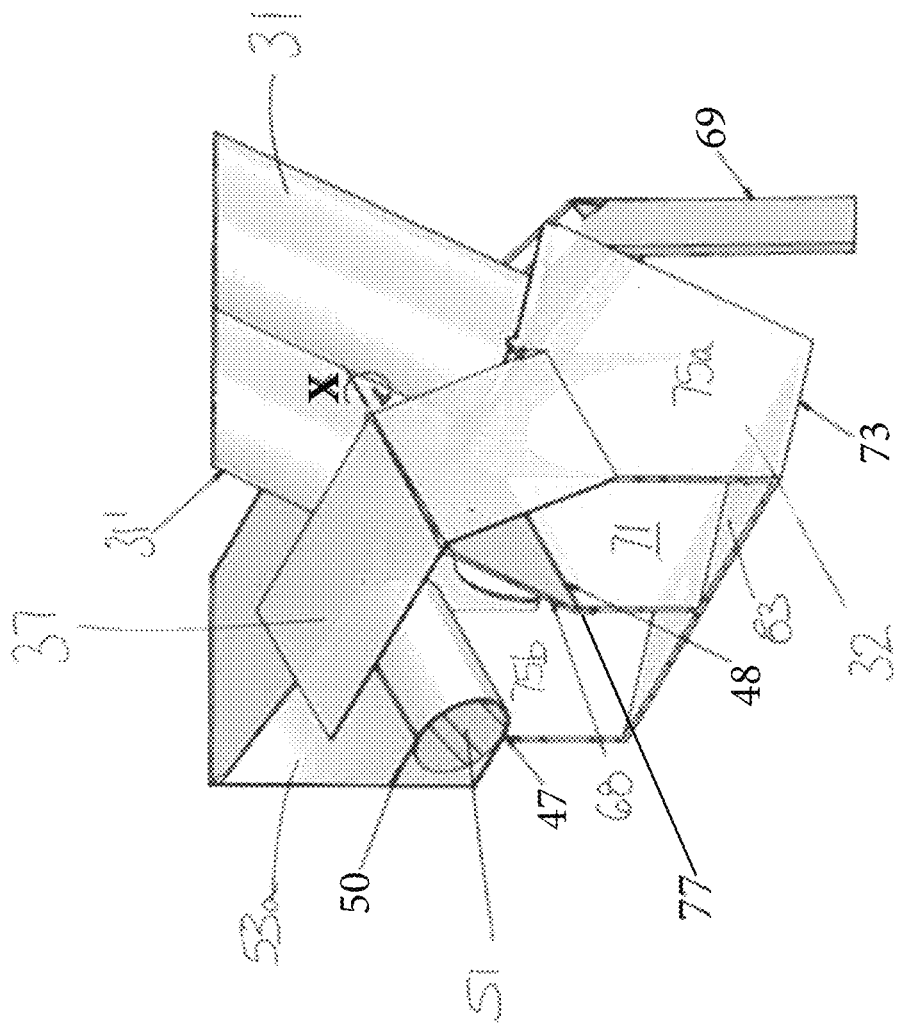
FIG. 6B is a perspective view of a partitioned dropper box according to FIG. 6A, configured to feed a second auger to the body.

FIG. 6B illustrates the location of the splitter plate 68 for filling the second chamber 34'. As the splitter plate 68 rotates away from the conveyor 50 and towards the central wall 71 a distal lip 77 is pushed against the central wall 71 inhibiting further pivotal movement of the splitter plate 68 and further sealing the second chamber 34' for receiving agricultural material. The lip 77 is clearly illustrated in the sectional view of FIG. 7A with the splitter plate 68 pushed up against the shield 37.

In the embodiment illustrated in FIGS. 6A, 6B, 7A and 7B, the first chamber 34 is fed by extending the conveyor 50 into the dropper-box 32 such that the first roller 51 releases agricultural material to fall under gravity into the first chamber 34. In the forward position the first roller 51 extends the path of the belt 53 over the second chamber 34', inhibiting agricultural material on the conveyor 50 from being dispersed into the second chamber 34'. The forward position of the first roller 51 brings the belt 53 into contact with a second scraper seam (or seal) 48.

As described above in relation to the first scraper seam 46, the second scraper seam 48 can comprise a rigid member held at a predetermined distance off the belt to remove agricultural material adhered to the surface 53a. The second scraper seam 48 can comprises a brush or flexible wiper blade to remove agricultural material from the belt surface 53a. Combinations of a rigid member, brush and flexible member can also be used along the scraper seam 48.

As the continuously looping belt 53 runs over the first roller 51 to travel back towards the second roller 52, the belt surface 53a is pulled across the second scraper seam 48 to dislodge and remove any agricultural material adhered to the surface 53a, thereby cleaning the belt 53 as it exits the dropper-box 32 (shown in FIG. 6A). Any residual agricultural material on the belt surface 53a is deposited into the first chamber 34.

The splitter plate 68 is coupled to the shield 37 to form a pivot axis X, about which the splitter plate 68 rotates. To feed the second chamber 34', the first roller 51 is retracted towards the second roller 52 pulling the conveyor 50 out of the dropper-box 32 and bringing the first roller 51 into contact with a third scraper seal 47.

As described above in relation to the second scraper seam 48, the second scraper seam 48 can comprise a rigid member held at a predetermined distance off the belt to remove agricultural material adhered to the surface 53a. The third scraper seam 48 can comprises a brush or flexible wiper blade to remove agricultural material from the belt surface 53a. Combinations of a rigid member, brush and flexible member can also be used along the scraper seam 48.

With the first roller 51 retracted out of the dropper-box 32 the splitter plate 68 can be rotated way from the shield 37 about the axis x to bring the lip 77 into contact with the dividing wall 71 and the second scraper seal 48 thereby sealing the second chamber 34'. Any agricultural material coming off the conveyor 50 is now channelled directly into the second chamber 34' and is restricted from entering the first chamber 34 (see FIG. 7A).

As the continuously looping belt 53 runs over the first roller 51 to travel back towards the second roller 52, the belt surface 53a is pulled across the third scraper seam 48 to dislodge and remove any agricultural material adhered to the surface 53a, thereby cleaning the belt 53 as it exits the dropper-box 32. Any residual agricultural material on the belt surface 53a is deposited into the second chamber 34'.

Figure 7A:
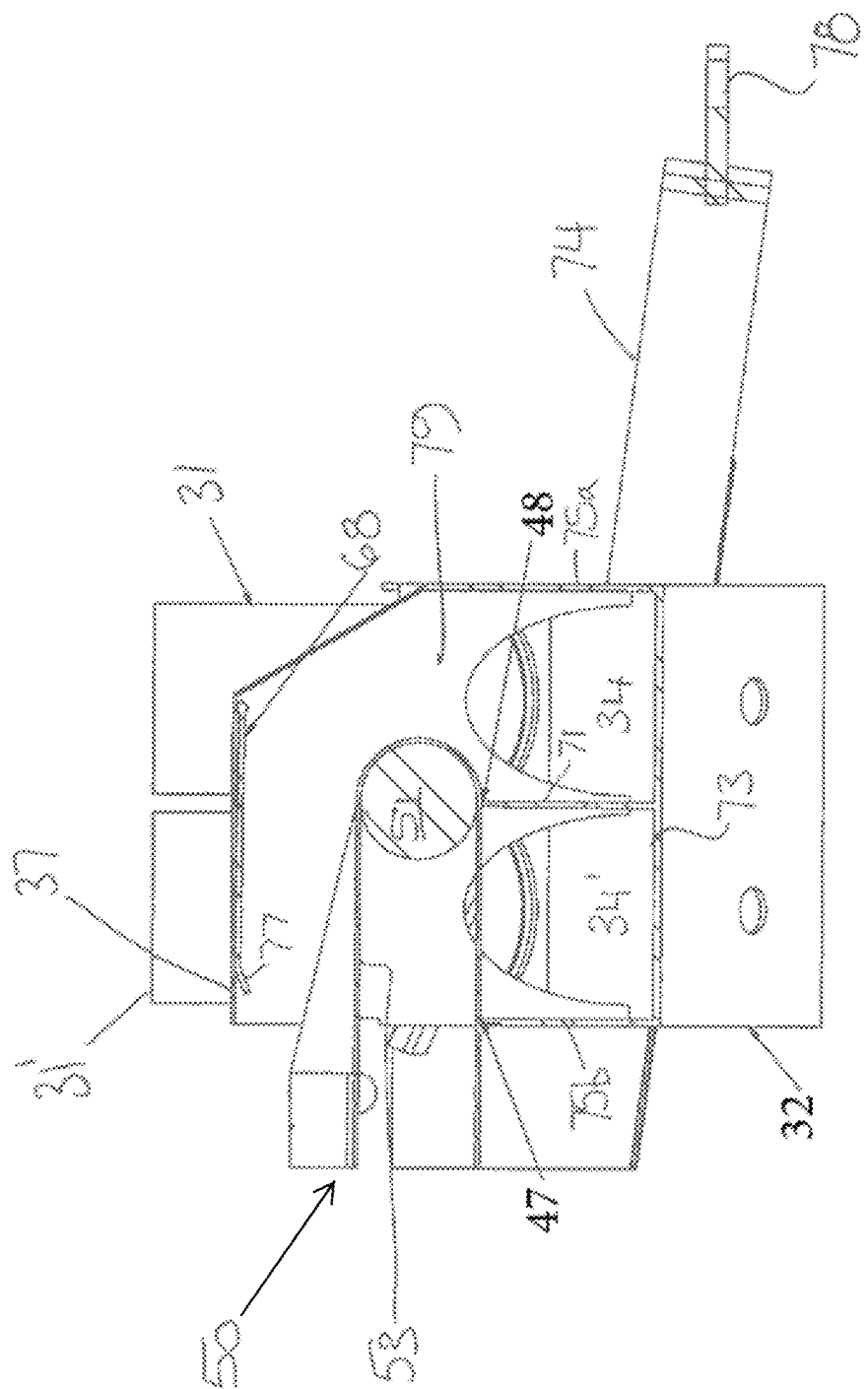
FIG. 7A is a sectional view of the dropper box of FIG. 6A, illustrating the orientation of a dividing wall to feed the first auger.
Figure 7B:
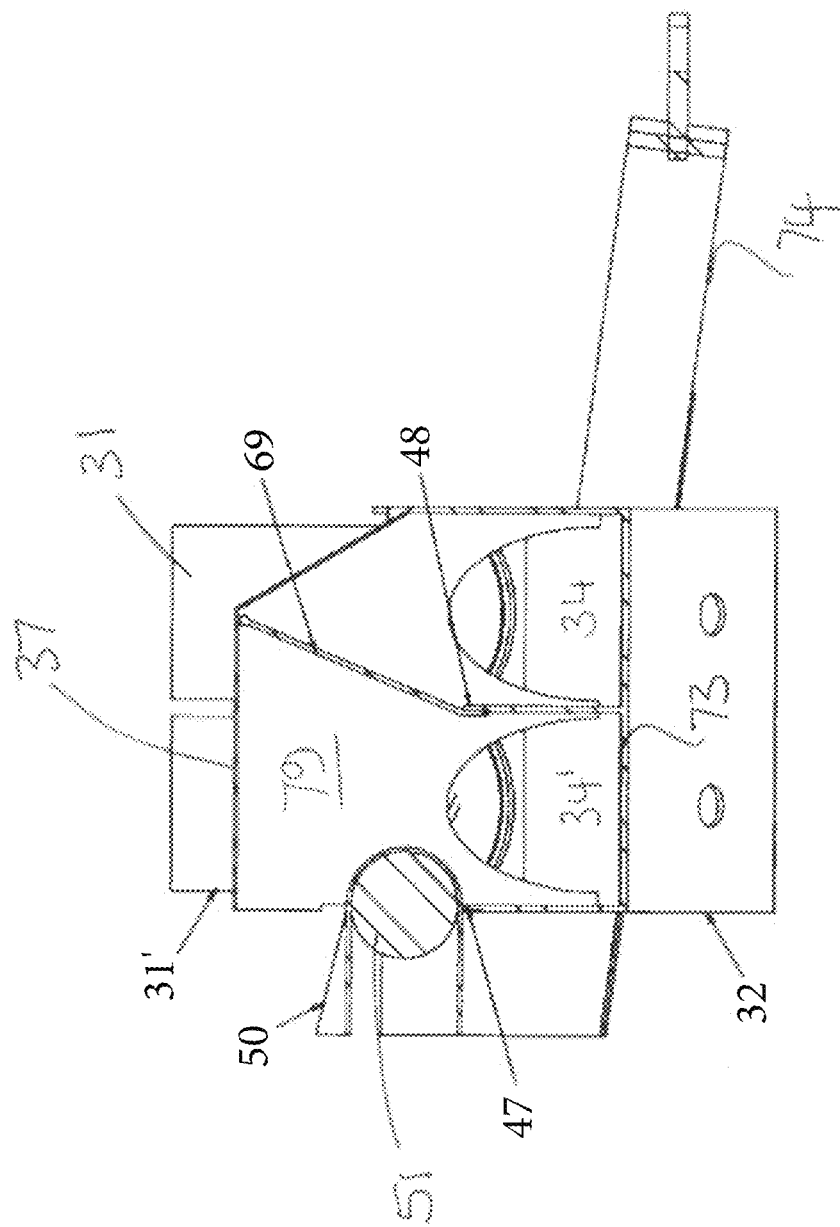
FIG. 7B is a sectional view of the dropper box of FIG. 6B, illustrating the orientation of the dividing wall to feed the second auger.

In FIGS. 7A and 7B a back plate 79 is illustrated extending from the base 73 of the dropper-box 32 to the shield 37, further preventing agricultural material from the first compartment 22 being mixed and contaminated with agricultural material from the second compartment 24 in the event that the level of agricultural material in either of chambers 34, 34' extends above a height of the dividing wall 71 between the two chambers 34, 34'.

Figure 8A:
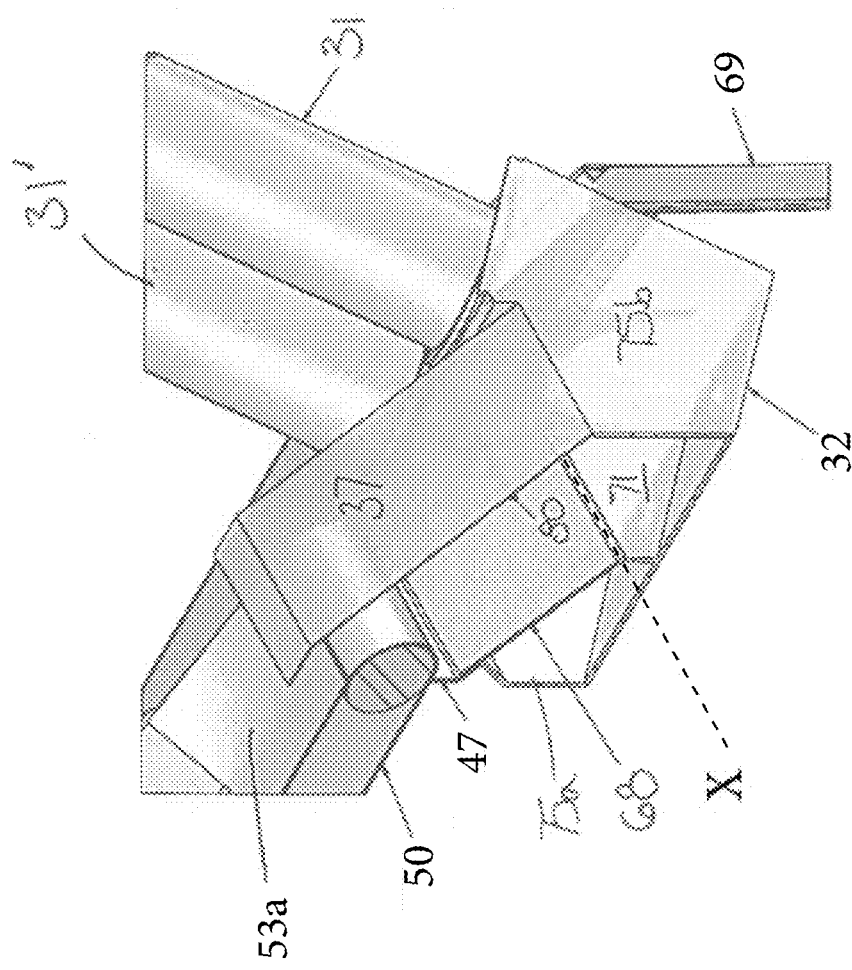
FIG. 8A is a perspective view of a partitioned dropper box according to another embodiment of the invention, configured to feed a first auger from the body.
Figure 8B:
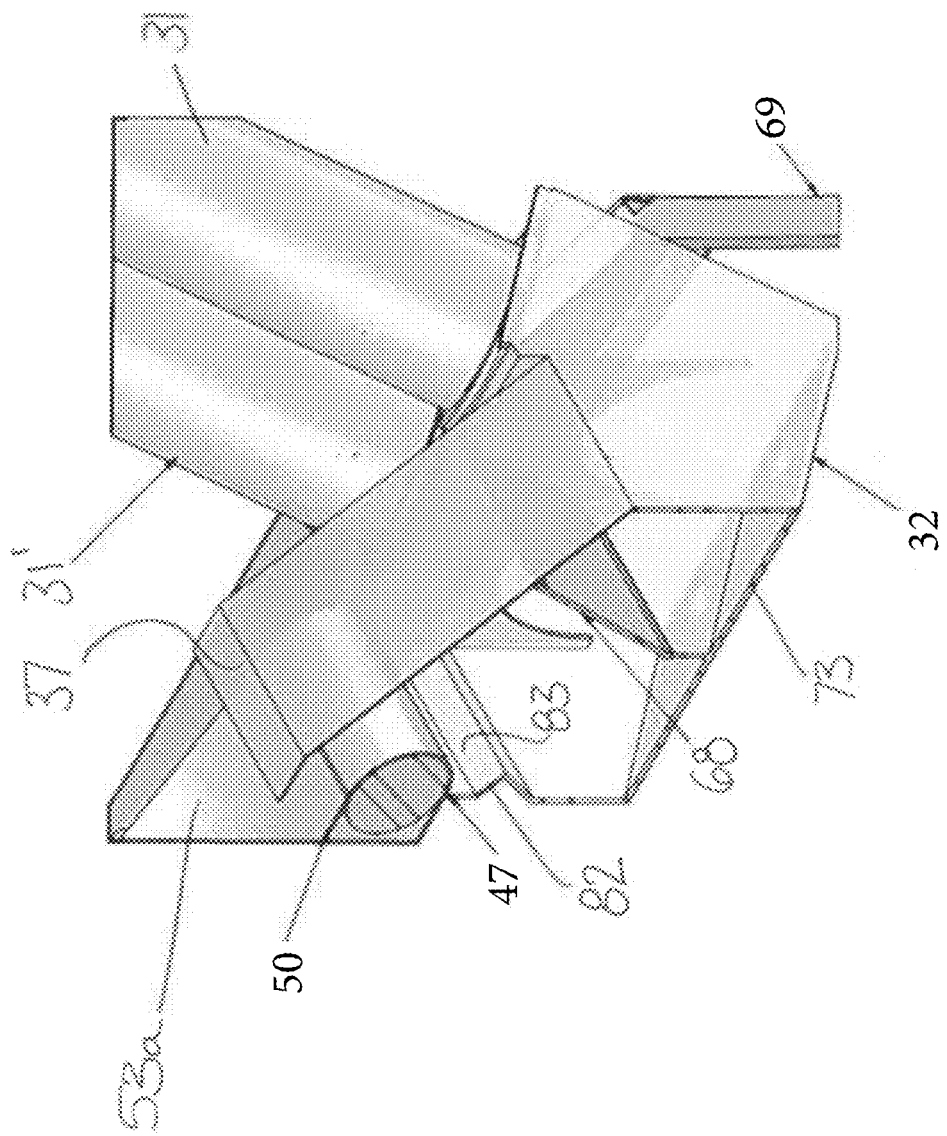
FIG. 8B is a perspective view of a partitioned dropper box according to FIG. 8A, configured to feed a second auger.

An alternative embodiment of the dropper-box 32 is illustrated in the perspective views of FIGS. 8A-8B and the sectional views of 9A-9B. In this embodiment the splitter plate 68 is pivotally coupled to the dividing wall 71 in the base 73 of the dropper-box 32. The splitter plate 68 rotates between a first position in which the first chamber 34 is fed from the conveyor 50, and a second position where the second chamber 34' is fed from the conveyor 50.

The splitter plate 68 in FIG. 8A illustrates a location of the splitter plate 68, wherein the splitter plate 68 is located for filling the first chamber 34. In this embodiment of the dropper-box 32 the first roller 51 of the conveyor 50 remains stationary and is not extended or retracted in relation to the dropper-box 32.

FIG. 8B illustrates the location of the splitter plate 68 for filling the second chamber 34'. As the splitter plate 68 rotates away from the conveyor 50 the distal lip 77 is driven towards a detent or stop 80 provided on an inner surface of the shield 37. The distal lip 77 is pushed against the stop 80 inhibiting further pivotal movement of the splitter plate 68 and further sealing the second chamber 34' for receiving agricultural material. The lip 77 and stop 80 are clearly illustrated in the sectional view of FIG. 9B with the splitter plate 68 pushed up against the stop 80 of the shield 37.

The base 73 of the dropper-box 32 on the first wall 75b provides a V-shaped recess 82 that protrudes inwardly into the chamber 34'. The recess 82 has an inclined wall 83 that receives the lip 77 of the splitter plate 68. When the lip 77 of the splitter plate 68 is supported parallel to the inclined wall 83 of the recess 82 the splitter plate 68 is prevented from rotating further towards the conveyor 50, guiding the agricultural material from the conveyor into the first chamber 34. This arrangement is illustrated in the sectional view of FIG. 9A, where the splitter plate 68 is abutted against the inclined wall 83 of the recess 82 to guide agricultural material into the first chamber 34.

As the continuously looping belt 53 runs over the first roller 51 to travel back towards the second roller 52, the belt surface 53a is pulled across the third scraper seam 47 to dislodge and remove any agricultural material adhered to the surface 53a, thereby cleaning the belt 53 as it exits the dropper-box 32. Depending on the position of the splitter plate 68 within the dropper-box 32, the dislodged agricultural material will be deposited into either of the selected chambers 34, 34'.

The splitter plate 68 is coupled to the dividing wall 71 at an uppermost portion 71a thereof to form a pivot axis X, about which the splitter plate 68 rotates (see FIG. 8A).

In FIGS. 9A and 9B the back plate 79 is illustrated extending from the base 73 of the dropper-box 32 to the shield 37, further preventing agricultural material from the first compartment 22 being mixed and contaminated with agricultural material from the second compartment 24 in the event that the level of residual agricultural material in either of chambers 34, 34' extends above a height of the dividing wall 71 or interferes with the sealing of the splitter plate 68 against the stop 80 of the recess 82.

The bin 1 can be propelled or pulled to move alongside a harvester such that the open top 16 of the body 10 receives harvested agricultural material therein. Draw bar 69 extends the chassis to hitch to the tractor, or other pulling vehicle. Once the body 10 has reached capacity the agricultural material can be stored in the body 10 or deposited in a secondary receptacle, for example a larger mother bin or transportation vehicle for further processing.

To disperse material from the body 10 to a mother bin (not illustrated) where the body 10 contains only a single agricultural material, both augers 31, 31' can be fed simultaneously by removing the splitter plate 68 from the dropper-box 32. This allows both augers 31, 31' to be fed simultaneously effectively doubling the unloading capacity of the bin 1.

Where dissimilar materials are held in compartments 22, 24, each auger 31, 31' is fed in-turn to distribute the first agricultural material to the desired receptacle and then to feed the second agricultural material to the second desired receptacle. First the splitter plate 68 is located in the correct orientation to feed the desired chamber 34 or 34'. The conveyor 50 is then selected to travel in a first direction from the outlet/s 18 towards the first roller 51 to thereby deliver agricultural material from the outlet/s 18 of the body 10 to the dropper-box 32 to feed the at least one auger 31, 31'. Then the corresponding outlet/s 18 to the selected compartment 22, 24 are opened to deliver agricultural material to the conveyor belt 53 at a desired rate.

Where both compartments 22, 24 contain the same agricultural material to be dispersed by spreader 40, the conveyor belt 53 is selected to travel in a second direction when the belt 53 moves from the outlet/s 18 towards the second roller 52. Then all outlet/s 18 to both compartments 22, 24 are opened simultaneously to deliver agricultural material to the conveyor belt 53 at a desired rate.

Where dissimilar materials are held in compartments 22, 24, they can be spread selectively, by selectively opening and closing the respective outlet/s 18 to the two compartments 22 and 24. Where dissimilar materials are to be spread contemporaneously, the conveyor 50 is selected to run in the second direction, towards the hopper 42 and the desired dispersing ratio is selected by partially opening and/or partially closing selected outlets 18.

The sensors 60, 62 and 64 are activated when at least one of the dispersing mechanisms 30, 40 and conveyor 50 are running to monitor and control the flow-rate and thus the volume of agricultural material released to the conveyor 50 and to measure the volume of agricultural material dispersed while the bin 1 is in use.

In a second embodiment of the invention, the bin 101 is configured in much the same manner as described above in relation to the first embodiment of the bin 1. However, instead of providing a base 12 to the bin having a plurality of outlets 18, the bin 101 provides a single elongate outlet 118, that extends substantially the entire length of the base 112 of the bin 101.

With reference to FIGS. 11a and 11b, there is illustrated a transportable agricultural bin 101 for storing and dispersing an agricultural material, comprising: a bin body 110 having a compartment 111 for storing the agricultural material, the compartment having an outlet 118 at a lower end thereof; at least one auger 131 and a spreader 140 to disperse the agricultural material; and a conveyor 150 provided under the outlet 118 and extending between the auger 130 and the spreader 140, wherein the conveyor 150 is configured to selectively transport the agricultural material from the outlet 118 to either the auger 131 or the spreader 140.

In this second embodiment of the bin 101, the outlet 118 has no closure 19 and the agricultural material within the cavity 111 falls directly, under gravity, from the bin body 110 onto the conveyor 150.

The bin body 110 is not partitioned to retain a first and a second agricultural material, and is configured to only contain a single agricultural material. The bin body 110 has a base 112 and a straight wall portion 115. The base 112 providing two inclined side walls 117 that slope towards one another, to converge along the single outlet 118.

The conveyor 150, provides a belt 153 having a plurality of projections 198 that pull the agricultural material from the base 112 of the bin body 110 to convey the agricultural material from the bin body 110 selectively towards the auger 131 or the spreader 140 of the bin 101. The plurality of projections 198 facilitate the movement of both granular/particulate agricultural materials from the bin body 110 to the spreader 140 and the auger 131 as well as non-particulate agricultural materials, for example manure or hay.

As with the first embodiment of the bin 1, the conveyor 150 is provided with at least two rollers 151 and 152. At least one of which rollers 151 and 152 is movable to vary a leading edge of the conveyor 150 relative to the bin body 110.

FIG. 11a illustrates a view of the agricultural bin 101 having a frame work 107 for supporting the cover 104 over the top of the bin 101. This fame work 107, although not illustrated in FIGS. 1-10 can also be attached to the bin body 10 of bin 1.

As the bin 101 is only configured to retain a single agricultural material, there is only one auger provided 130 (and auger screw 100), as there is no longer a risk of cross-contamination between a first and a second agricultural material (see FIG. 11b). It is however contemplated, that a second auger can be installed adjacent the first auger 131 to increase the dispersal rate capability of the bin 101.

Figure 12:
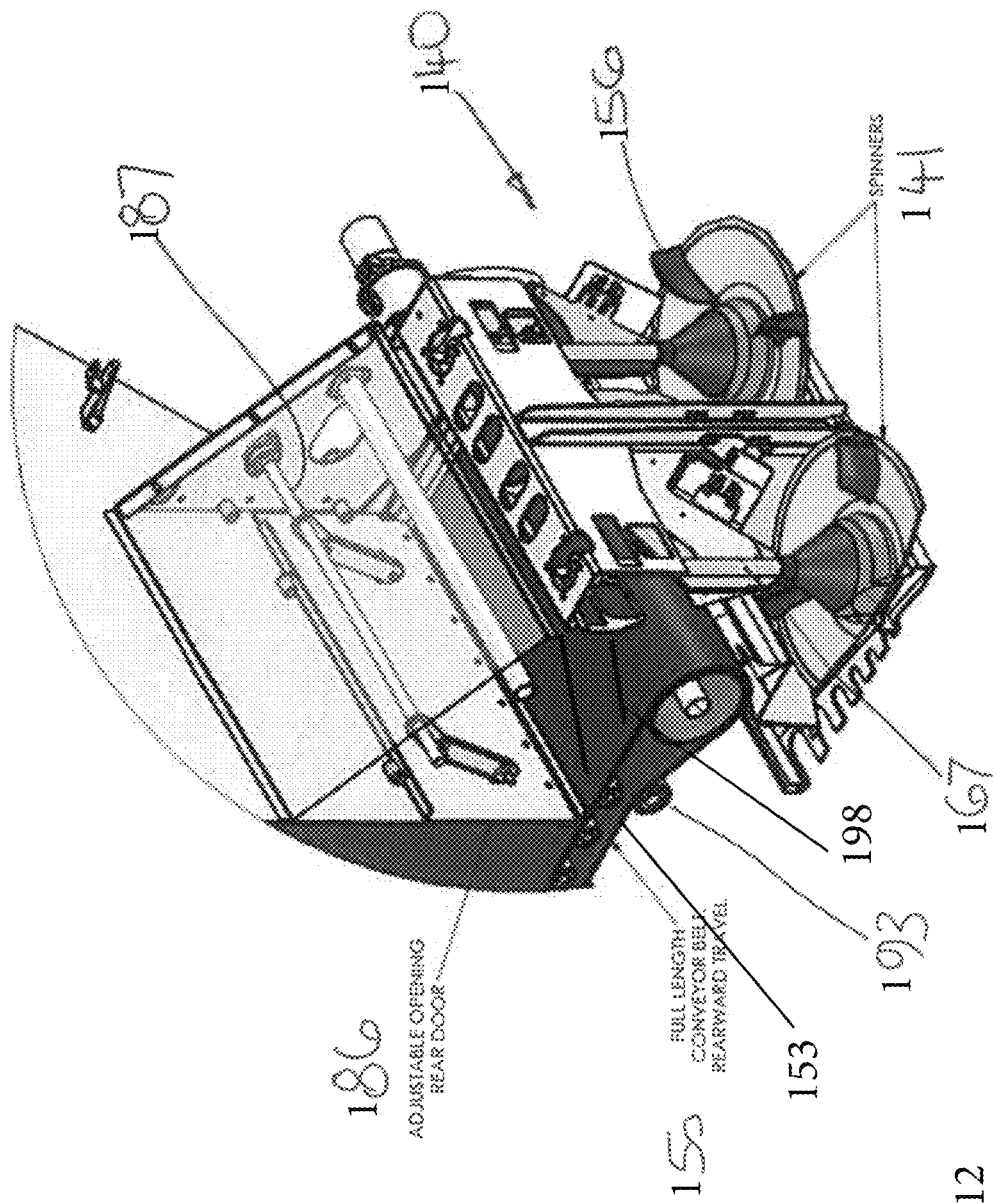
FIG. 12 is a perspective view of the spreader of the second embodiment of the agricultural bin, illustrating a pair of rotating discs having three curved vanes to direct flowable material therefrom.

FIG. 12 illustrates an adjustable opening rear door 186 and mechanism 187 for remotely opening and closing the door 186 to thereby facilitate or prevent flow or agricultural material from the conveyor 150 to the spreader 140. A tension pulley 193 is provided adjacent the roller 152, to allow the tension in the conveyor belt 153 to be tightened or slackened.

FIG. 12 illustrates the spreader 140 having a pair of rotatable discs 141 having three vanes 156 extending therefrom. The discs 141 are mounted distally on a pair of spindles 167 to drive the discs 140 to rotate at high speed and thereby disperse agricultural material upon contact therewith.

Figure 13:
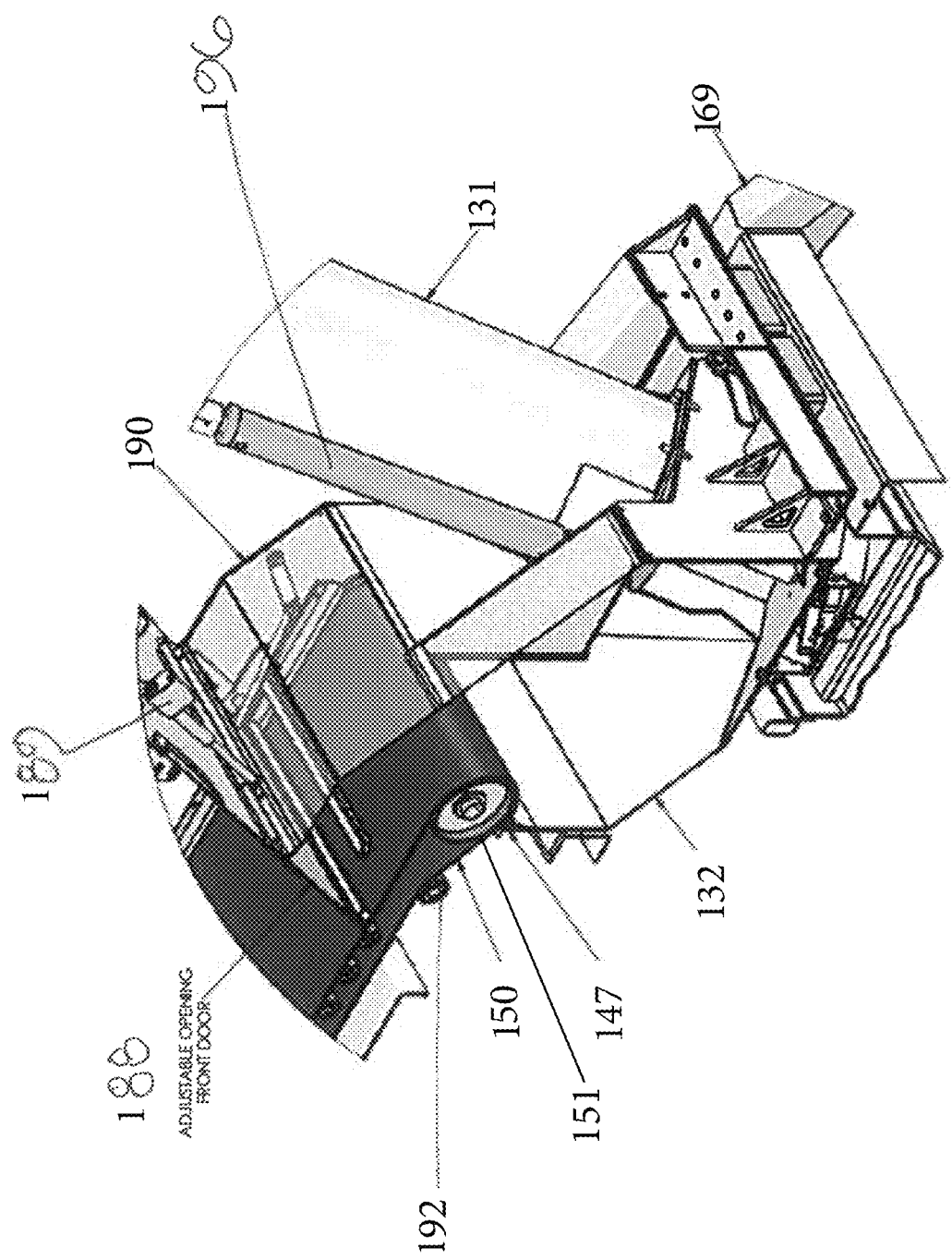
FIG. 13 is a perspective view of the conveyor, illustrating an adjustable front door, for sealing between the conveyor and the dropper box.

FIG. 13 illustrated an adjustable opening front door 188 and mechanism 189 for remotely opening and closing the door 188 to thereby facilitate or prevent flow or flowable material from the conveyor to the dropper box 132. A tension pulley 192 is provided adjacent the roller 151, to allow the tension in the conveyor belt 53 to be tightened or slackened.

Also shown in FIG. 13 is a ram 96 to automate the articulation of the folding and unfolding of the auger 131 between the stowage or transportation configuration for the auger 131 and the operative configuration.

A removable access cover 90 extends from the conveyor 50 towards the dropper-box 32 to prevent contamination to the flowable material. The cover 90 can ne quickly and easily removed for access to the conveyor and dropped-box, if required.

It will be appreciated by persons skilled in the art that numerous variations and modifications may be made to the above-described embodiments, without departing from the scope of the following claims. The present embodiments are, therefore, to be considered in all respects as illustrative of the scope of protection, and not restrictively.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A transportable agricultural bin for storing and dispersing an agricultural material, comprising:
   a bin body having a compartment for storing the agricultural material, the compartment having an outlet at a lower end thereof;
   at least one auger and a spreader to disperse the agricultural material, wherein the auger located toward a first end of the bin body and the spreader located toward a second end of the bin body; and
   a conveyor provided under the outlet and extending between the auger and the spreader, wherein the conveyor is configured to selectively transport the agricultural material from the outlet to
(i) a collector located at the first end of the bin body having at least one chamber configured to receive and store agricultural material from the conveyor, and the chamber has an adjustable shield arrangement to selectively vary the amount of agricultural material directed to a feeding inlet of the auger; or
(ii) a hopper located at the second end of the bin body having an adjustable gate to selectively vary the amount of agricultural material fed to the spreader,
such that the conveyor operates to transport the agricultural material in opposite directions between the at least one auger and the spreader.

2. The transportable agricultural bin of claim 1, wherein the body has only one outlet that extends along the lower end of the bin body and opens on to the conveyor.

3. The transportable agricultural bin of claim 1, wherein the body has at least two compartments for separately storing a first agricultural material and a second agricultural material, each of the at least two compartments having a respective outlet at a lower end thereof.

4. The transportable agricultural bin of claim 3, wherein each outlet of the body further comprises a closer for sealing the outlet, each closer being movably engaged with the bin body to vary a flow rate of the agricultural material through the outlet.

5. The transportable agricultural bin of claim 1, wherein the conveyor is configured to operably transport the agricultural material to the auger in a first operative mode and to transport the agricultural material to the spreader in a second operative mode.

6. The transportable agricultural bin of claim 1, wherein the conveyor is extendable towards the collector.

7. The transportable agricultural bin of claim 1, wherein the body has at least two compartments for separately storing a first agricultural material and a second agricultural material, each of the at least two compartments having a respective outlet at a lower end thereof, wherein the collector is configured to provide a first chamber that receives and retains the first agricultural material from a first compartment of the bin body and a second chamber that receives and retains the second agricultural material from a second compartment of the bin body, via the conveyor.

8. The transportable agricultural bin of claim 7, further comprising a guide disposed between the first end of the conveyor and the collector, to guide the first and second agricultural materials from the conveyor to one of the first or second chambers of the collector.

9. The transportable agricultural bin of claim 8, wherein the guide is movably engaged with the collector to transition between a first position for channelling the first agricultural material to the first chamber and a second position for channelling the second agricultural material to the second chamber.

10. The transportable agricultural bin of claim 8, wherein at least one of the guide and the collector includes a scraper to remove agricultural material from the conveyor.

11. The transportable agricultural bin of claim 1 wherein the conveyor comprises a continuous belt driven around at least two rotatable members.

12. The transportable agricultural bin of claim 11, wherein a first rotatable member of the at least two rotatable members forms a leading edge of the conveyor, the first rotatable member being movably mounted to adjust the leading edge of the conveyor relative to the bin body.

13. The transportable agricultural bin of claim 1, wherein at least one sensor is located along the conveyor to measure a height of agricultural material on the conveyor.

14. The transportable agricultural bin of claim 13, wherein the height of agricultural material on the conveyor is used to calculate a volume of agricultural material transported to either the auger or the spreader.

15. The transportable agricultural bin of claim 1, wherein the bin body and the conveyor are supported on a frame, the frame comprising at least one of a pair of wheels and a caterpillar track.

16. A trailer or a vehicle comprising a transportable agricultural bin according to claim 1.

* * * * *